United States Patent
Fujii et al.

(10) Patent No.: US 10,802,958 B2
(45) Date of Patent: Oct. 13, 2020

(54) STORAGE DEVICE, ITS CONTROLLING METHOD, AND STORAGE SYSTEM HAVING THE STORAGE DEVICE

(71) Applicant: HITACHI, LTD., Tokyo (JP)

(72) Inventors: Hiroki Fujii, Tokyo (JP); Hideyuki Koseki, Tokyo (JP); Atsushi Kawamura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 204 days.

(21) Appl. No.: 16/066,730

(22) PCT Filed: Jan. 21, 2016

(86) PCT No.: PCT/JP2016/051748
§ 371 (c)(1),
(2) Date: Jun. 28, 2018

(87) PCT Pub. No.: WO2017/126091
PCT Pub. Date: Jul. 27, 2017

(65) Prior Publication Data
US 2019/0004942 A1 Jan. 3, 2019

(51) Int. Cl.
*G06F 3/06* (2006.01)
*G06F 12/02* (2006.01)
*G06F 12/1009* (2016.01)

(52) U.S. Cl.
CPC .......... *G06F 12/0246* (2013.01); *G06F 3/061* (2013.01); *G06F 3/0656* (2013.01);
(Continued)

(58) Field of Classification Search
None
See application file for complete search history.

(56) References Cited

U.S. PATENT DOCUMENTS 7,529,905 B2 5/2009 Sinclair
8,601,347 B1 12/2013 Koseki
(Continued)

FOREIGN PATENT DOCUMENTS

JP 2010-055210 A 3/2010
JP 2011-243116 A 12/2011
(Continued)

OTHER PUBLICATIONS

International Search Report of PCT/JP2016/051748 dated Mar. 1, 2016.

*Primary Examiner* — Brian R Peugh
(74) *Attorney, Agent, or Firm* — Mattingly & Malur, PC

(57) ABSTRACT

A storage device determines whether or not reading target data subjected to a first conversion process is divided and stored into multiple pages. When the data subjected to the first conversion process is stored in one of a plurality of pages, the data is read from the page, and a second conversion process for returning the data to a state before the data is subjected to the first conversion process is executed to the data. When the reading target data is divided and stored into two or more of the plurality of pages, a portion of the data is read from each of the two or more pages in which the portion of the data is stored, the portion of the data is stored in the buffer memory, the data subjected to the first conversion process is restored, and the second conversion process is executed to the restored data.

15 Claims, 16 Drawing Sheets

(52) U.S. Cl.
CPC .......... *G06F 3/0661* (2013.01); *G06F 3/0679* (2013.01); *G06F 3/0688* (2013.01); *G06F 3/0689* (2013.01); *G06F 12/1009* (2013.01); G06F 3/067 (2013.01); G06F 2212/401 (2013.01); G06F 2212/402 (2013.01); G06F 2212/403 (2013.01); G06F 2212/7201 (2013.01)

(56) References Cited

U.S. PATENT DOCUMENTS

| | | | |
|---|---|---|---|
| 9,710,199 B2* | 7/2017 | Ioannou | G06F 3/0619 |
| 2010/0057978 A1 | 3/2010 | Takamura et al. | |
| 2014/0310575 A1* | 10/2014 | Asano | G06F 11/1068 |
| | | | 714/773 |

FOREIGN PATENT DOCUMENTS

| | | |
|---|---|---|
| WO | 2013/190597 A1 | 12/2013 |
| WO | 2015/114754 A1 | 8/2015 |
| WO | 2015/145647 A1 | 10/2015 |

* cited by examiner

FIG. 8

| LP# | PP# | DATA OFFSET | DATA LENGTH | PAGE STRADDLING INFORMATION |
|---|---|---|---|---|
| 0 | A | 0 | 1 | NO |
| 1 | B | 3 | 2 | YES |
| ... | ... | ... | ... | ... |
| N | X | 2 | 3 | YES |
| 45A | 45B | 45C | 45D | 45E |

FIG. 13

| LP# | PP# | DATA OFFSET | ECC TYPE | PAGE STRADDLING |
|---|---|---|---|---|
| 0 | A | 0 | BCH | NO |
| 1 | B | 3 | LDPC | YES |
| ... | ... | ... | ... | ... |
| N | X | 2 | NNNN | YES |
| 90A | 90B | 90C | 90D | 90E |

90

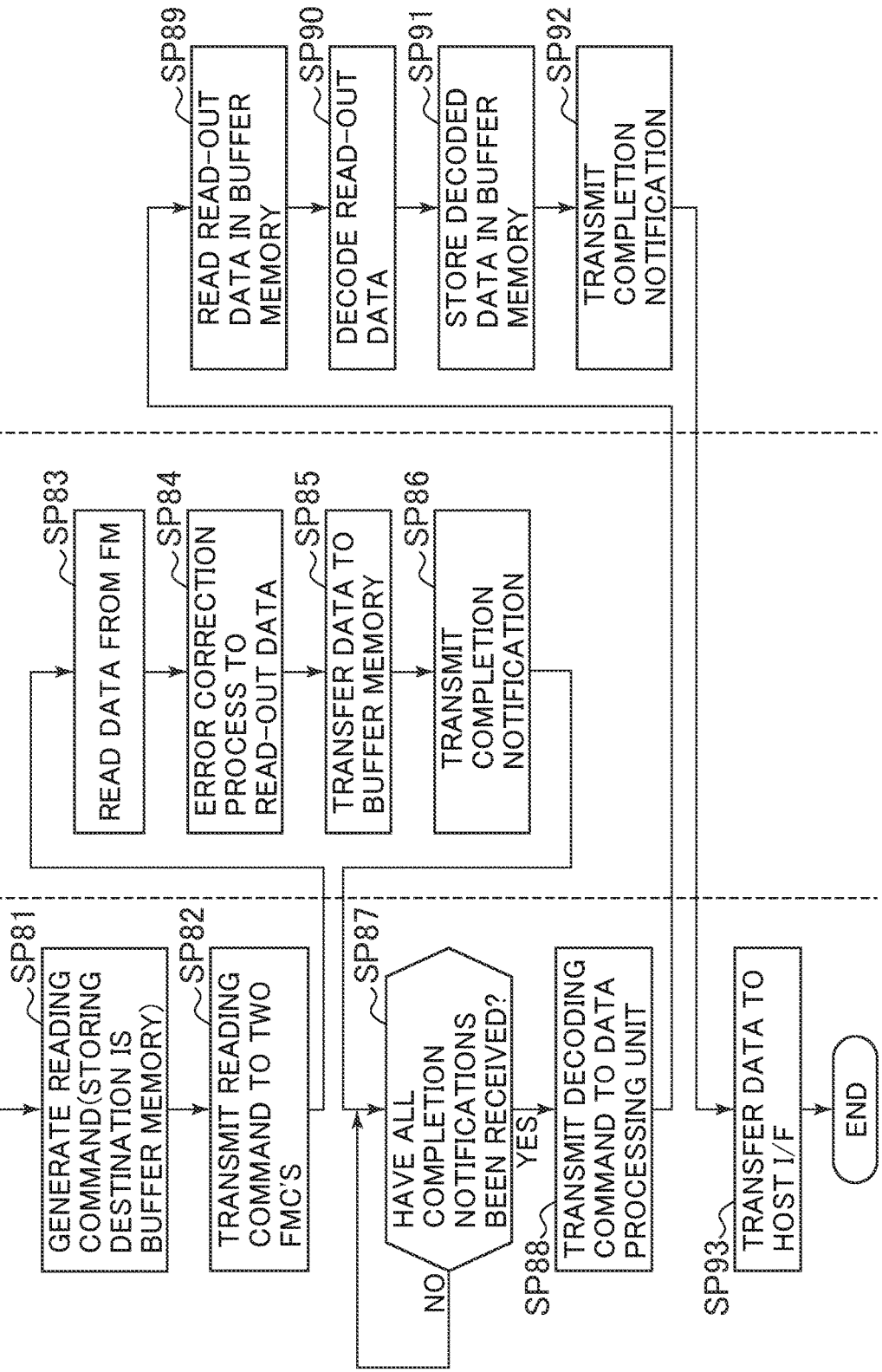

STORAGE DEVICE, ITS CONTROLLING METHOD, AND STORAGE SYSTEM HAVING THE STORAGE DEVICE

TECHNICAL FIELD

The present invention relates to a storage device, its controlling method, and a storage system having the storage device.

BACKGROUND ART

As semiconductor storage devices that enable high-speed access, SSDs (Solid State Drives) have been in widespread use recently. Such a semiconductor storage device has a hardware architecture that has a plurality of nonvolatile semiconductor memory chips in the device and drives the memory chips in parallel. Only the number of semiconductor memory chips connected by buses can be operated in parallel, so that the operation of the memory chips in parallel can achieve high input-output performance. As compared with a hard disk drive (HDD: Hard Disk Drive) that is a conventional magnetic storage device, the semiconductor storage device has the merit of improving performance by the parallelization of the semiconductor memory chips, of being capable of coping with partial failure, and of being capable of easily designing performance according to the number of chips and the number of parallel connections. As the nonvolatile semiconductor memory chips, flash memory chips have been in widespread use.

By the way, with the widespread use of the SSDs, the increase in the capacity of the drive alone and the reduction in bit cost have been required. Due to such increase in capacity and reduction in bit cost, the microfabrication of the memory elements has been advanced, and to address the system level, attention has been given to a technique for reducing the amount of data, such as data compression.

The data compression technique compresses data to be written that is given from the host (hereinafter, called writing target data), and thus reduces the amount of data actually stored in the flash memory, thereby achieving increased capacity, longer life, and higher performance. Alternatively, the data compression technique may be used for storing a logical volume larger than a physical volume. When the data compression is performed, the logical data length becomes short to cause displacement from the size of the physical page that is a unit for actually writing data. Due to this, although a plurality of compressed data can be stored in one physical page, there is the case where the compressed data cannot be accommodated within one physical page. In this case, the non-accommodated compressed data is divided and stored into two or more physical pages. In this way, "page straddling" in which data is stored across a plurality of physical pages may occur (for example, see Patent Literature 1).

In addition, the flash memory has, due to its physical characteristic, properties in which stored data is likely to be destructed. Accordingly, the typical SSD stores an ECC (Error-Correcting Code) that is the error-correcting code of data, in the physical page together with the data, and uses the ECC to correct the error partially caused during the reading of the data.

The ECC circuit divides inputted data according to a certain data length, and adds, to each segment obtained by such division (hereinafter, called a data segment), the ECC of the data segment, as an ECC portion. The combination of one data segment and the ECC portion of the data segment is called a code word (CW: Code Word).

The strength of the error correction is determined according to the ratio of the ECC portion to the code word, and as the ECC portion is larger, a larger number of error bits can be corrected. Accordingly, proposed is a method for decreasing the ECC portion with respect to the physical page having a small number of error bits and for increasing the ECC portion with respect to the physical page having a large number of error bits.

When this method is applied to the SSD, the data length of each code word actually stored in the flash memory is changed according to the strength of the ECC, and with this, the data length of the entire writing target data is changed, so that size deviation occurs between the data length and the physical page, with the result that the page straddling may occur.

In the SSD equipped with the function of the data conversion process (some process with the above-described change in size) in this manner, the page straddling may occur in data written into the flash memory, and when the page straddling occurs, data for one logical page is required to be read from two physical pages.

CITATION LIST

Patent Literature

Patent Literature 1: U.S. Pat. No. 7,529,905

SUMMARY OF INVENTION

Technical Problem

When the data conversion process is performed, the process for returning converted data to its original state is required. For example, when having the data compression function, the SSD requires the extension function for returning compressed data to its original state. Typically, when the compressed data is extended, the extension is not enabled unless all the divided compressed data are collected.

Consequently, when the page straddling occurs from the compressed data division, only each of the divided compressed data cannot be extended, so that all the divided compressed data are required to be collected and restored before being extended. Here, to restore the divided data, it is necessary to temporarily store the data in the buffer memory. However, the buffer memory has the following problem.

Typically, the SSD has a plurality of flash memories each including a plurality of flash memory chips, and a controller that controls the input and output of data to and from these flash memories (hereinafter, called a flash controller). In addition, a buffer memory including DRAM (Dynamic Random Access Memory) for temporarily holding the data inputted to and outputted from the flash memory is provided in the flash controller, and the SSD equipped with the function of subjecting the data inputted to and outputted from the flash memory to some process, such as the compression process and the ECC addition process, is provided with a data processing circuit and the like for subjecting the data to the process.

In the SSD provided with such data processing circuit, writing target data given from the higher-level device is stored once in the above-described buffer memory during the writing of the data. Then, this data is read from the buffer memory by the data processing circuit, and is subjected to the predetermined process so as to be written back into the buffer memory, and thereafter, the data is read from the buffer memory, and is written into the flash memory.

In addition, in such SSD, reading target data required from the higher-level device is read from the flash memory into the buffer memory during the reading process of the data, the read-out data is subjected to the predetermined process in the data processing circuit so as to be written back into the buffer memory, and thereafter, the data is read from the buffer memory, and is transmitted to the higher-level device.

In the SSD equipped with some data processing function in this manner, in addition to the input and output of data to and from the flash memory, various processes to the data are performed via the buffer memory. Due to this, in the SSD of such type, data having the amount of data that is several times larger than the amount of data inputted to and outputted from the SSD is inputted to and outputted from the buffer memory, resulting in the excessive use of the bandwidth of the buffer memory. Consequently, when the amount of data inputted to and outputted from the SSD in increased, there is a fear that the bandwidth of the buffer memory becomes a bottleneck portion in the performance of the SSD.

In the above-described compression example, when the page straddling occurs, the buffer memory is required to be used, and when the page straddling does not occur, the buffer memory is not required to be used. To increase the performance of the SSD, the amount of data inputted to and outputted from the buffer memory is required to be reduced by discriminating the case where the buffer memory is required to be used and the case where the buffer memory is not required to be used.

The present invention has been made in view of the above points, and an object of the present invention is to propose a storage device capable of effectively preventing the lowering of performance, a method for controlling the storage device, and a storage system having the storage device.

Solution to Problem

To address such problems, the present invention provides a storage device including a plurality of storage media each having a plurality of pages that are each the reading and writing unit of data, a buffer memory temporarily holding the data read from and written into the plurality of storage media, a medium controller executing a first conversion process to the data read from and written into the plurality of storage media, and reading and writing the data to which the first conversion process is executed, from and into the plurality of storage media. The medium controller determines: whether or not the reading target data subjected to the first conversion process is divided and stored into two or more of the plurality of pages; when the data subjected to the first conversion process is stored in one of the plurality of pages, reads the data from the page, and executes, to the data, a second conversion process for returning the data to a state before the data is subjected to the first conversion process; and when the reading target data is divided and stored into two or more of the plurality of pages, reads a portion of the data from each of the two or more pages in which the portion of the data is stored, stores the portion of the data in the buffer memory, restores the data subjected to the first conversion process, and executes the second conversion process to the restored data.

Advantageous Effects of Invention

According to the present invention, the amount of data inputted to and outputted from the buffer memory can be efficiently reduced, and a bottleneck in performance due to the excessive use of the bandwidth of the buffer memory can be improved, so that the lowering of the performance of the storage device can be effectively prevented.

BRIEF DESCRIPTION OF DRAWINGS

FIG. 8 is a concept diagram illustrating the structure example of a logical-physical conversion table according to the first embodiment.

FIG. 13 is a concept diagram illustrating the structure example of a logical-physical conversion table according to the second embodiment.

FIG. 16 is a flowchart illustrating the flow of the reading process in the flash storage according to the second embodiment.

DESCRIPTION OF EMBODIMENTS

Embodiments of the present invention will be described below in detail with reference to the drawings.

It is to be noted that although in the following description, the information of the present invention will be described by the representations of "aaa table", "aaa list", "aaa DB", "aaa queue", and the like, other representations, in addition to the data structure, such as the table, list, database (DB), and queue, may be used for these information. For this, to represent that the information does not depend on the data structure, the "aaa table", "aaa list", "aaa DB", "aaa queue", and the like may be called "aaa information".

In addition, in describing the content of each information, the representations of "identification information", "identifier", "name", and "ID" are used, but these can be replaced with each other.

In the following description, the "program" may be a subject word, but since the program is executed by the processor to perform the predetermined process while using the memory and the communication port (communication control device), the processor may be a subject word. In addition, the process disclosed with the program as a subject word may be a process performed by the computer, such as the management server, and the information processing device. Further, part or the whole of the program may be achieved by dedicated hardware.

Also, various programs may be installed into the storage system by the program distribution server and the computer readable storage medium.

Also, in the following description, the physical storage medium may be represented as a "disk" for convenience, but this representation does not necessarily mean that the physical storage medium is a disk-like storage medium. In the following description, for example, the "disk" is often referred to as an SSD.

In the following description, the unit of a period or time is not limited. For example, the unit of a period or time may be represented as one of year, month, day, hour, minute, and second, or as a combination of two or more of these.

Also, in this embodiment, the nonvolatile semiconductor storage medium included in the SSD is a flash memory. The flash memory according to this embodiment is a flash memory of the type in which erasing is performed for each block and the reading and writing of data are performed for each page, and is typically an NAND flash memory. However, as the flash memory, other types of flash memories (for example, an NOR flash memory) are also applicable in place of the NAND flash memory. In addition, in place of the flash memory, other types of nonvolatile memories, for example, semiconductor memories, such as an MRAM (Magnetoresistive Random Access Memory) that is a magnetoresistive random access memory, an ReRAM (Resistance Random Access Memory) that is a resistance random access memory, and an FeRAM (Ferroelectric Random Access Memory) that is a ferroelectric random access memory, and a phase-change memory may be applied.

Figure 1:
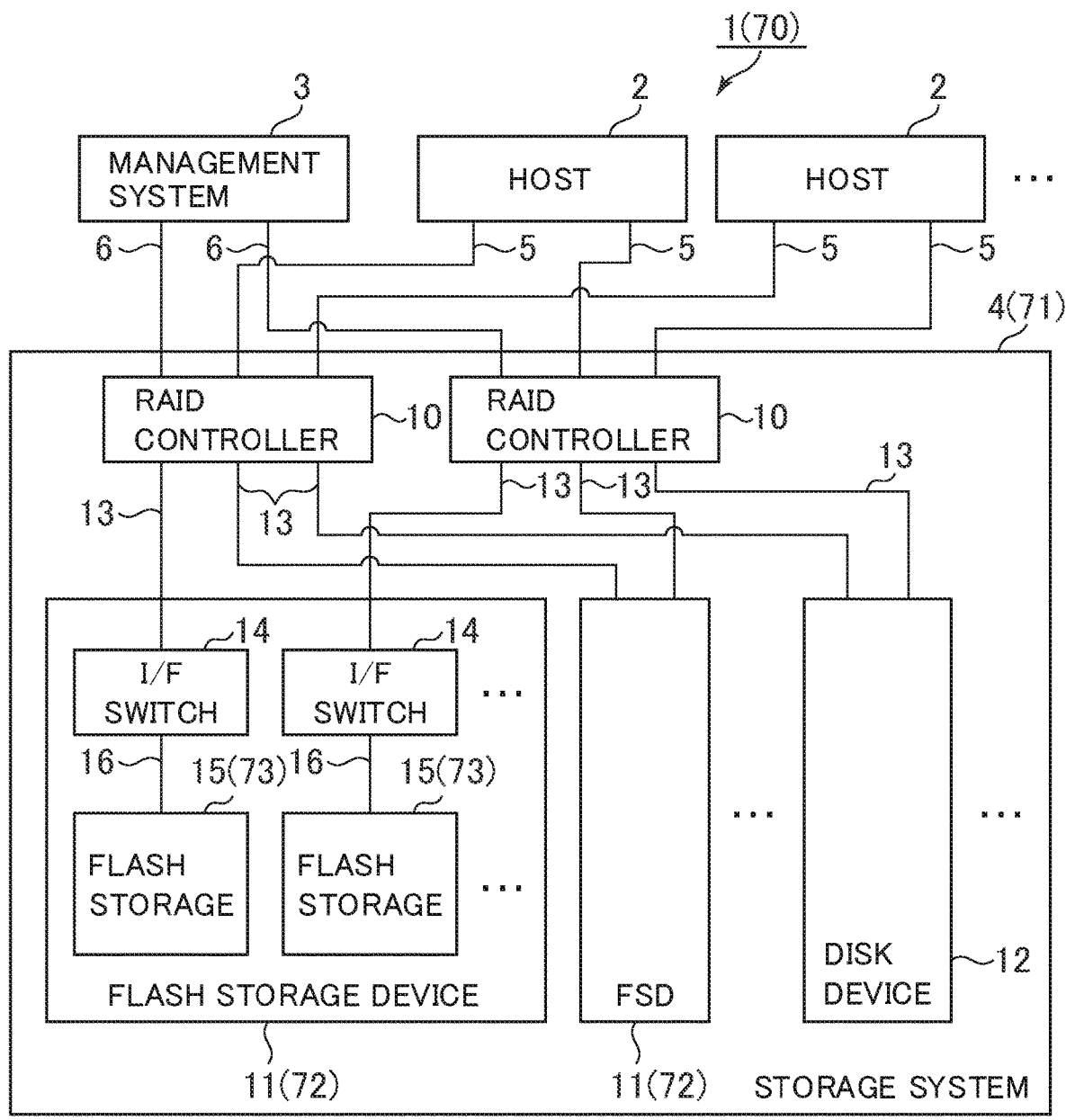
FIG. 1 is a block diagram illustrating the overall configuration of a computer system according to first and second embodiments.

(1) First Embodiment (1-1) The Configuration of a Computer System According to this Embodiment FIG. 1 illustrates a configuration example of a computer system according to this embodiment. A computer system 1 has one or a plurality of host computers (hereinafter, called a host or hosts) 2, a management system 3, and a storage system 4.

The at least one host 2 is a computer device having an information processing resource, such as a CPU (Central Processing Unit) and a memory, and includes a personal computer, a workstation, a main frame, and the like. The host 2 has a communication port for connecting the host 2 to the storage system 4, the port being connected to the storage system 4 via a host connection path 5.

Likewise, the management system 3 is a computer device having an information processing resource, such as a CPU and a memory, and includes a personal computer, a workstation, a main frame, and the like. The management system 3 further has a port for connecting the management system 3 to the storage system 4, the port being connected to the storage system 4 via a management connection path 6.

It is to be noted that although in FIG. 1, the case where the configuration that directly connects the host 2 and the storage system 4 is applied as the host connection path 5 has been described, the host connection path 5 may be configured of a network called a SAN (Storage Area Network), so that a large number of hosts 2, the management system 3, and the storage system 4 can be connected.

In this case, as the SAN, a protocol, such as a fibre channel (Fibre Channel) and iSCSI (internet Small Computer System Interface), can be used. In addition, the management connection path 6 may be the same as the host connection path 5, or may be different from the host connection path 5. For example, the host connection path 5 may be the SAN, and the management connection path 6 may be a LAN (Local Area Network). At least one of the host connection path 5 and the management connection path 6 may be a communication network other than the above-described SAN and LAN.

The storage system 4 has one or a plurality of RAID (Redundant Arrays of Inexpensive Disks) controllers 10, one or a plurality of flash storage devices 11, and one or a plurality of disk devices 12.

The at least one RAID controller 10 is a functioning unit that has the function of controlling the reading and writing of data by a RAID method with respect to the at least one flash storage device 11 and the at least one disk device 12. Specifically, the RAID controller 10 divides writing target data given from the host 2 by a predetermined unit, and distributes the divided data into a plurality of flash storage devices 11 and a plurality of disk devices 12, whereas the RAID controller 10 reads corresponding data from each of the flash storage devices 11 and each of the disk devices 12 according to the request from the host 2, combines the read-out data to restore the original data, and transmits the restored data to the host 2. For this, the RAID controller 10 is connected to each of the flash storage devices 11 via each internal bus 13 and to each of the disk devices 12 via each internal bus 13. It is to be noted that although the storage system 4 that is a system that achieves the redundant configuration by the RAID has the RAID controller 10, the present invention is not limited to the adoption of the RAID configuration.

The flash storage device 11 has respectively one or a plurality of interface switches 14 and one or a plurality of flash storages 15. The respective interface switches 14 are devices that perform protocol control during the communication with the RAID controller 10, and are connected to the corresponding flash storage 15 via an internal bus 16. The at least one flash storage 15 is a storage medium that actually stores data, and includes, for example, the SSD.

In addition, the disk device 12 has a disk type storage medium, for example, a hard disk drive. As the interface of the hard disk drive, for example, a fibre channel, SAS (Serial Attached SCSI), and ATA are applicable. It is to be noted that in place of the hard disk drive, it is possible to apply, as the disk type storage medium, other types of media, for example, a DVD (Digital Versatile Disk) drive. Further, in place of the disk device 12, it is possible to apply other types of storage media, for example, a tape device having a tape.

Although in the description of this embodiment, the flash storage device 11 and the disk device 12 are discriminated, the flash storage device 11 and the disk device 12 are physically and logically compatible, so that the flash storage device 11 and the other disk device 12 can be used without being discriminated. For example, the SSD having the SAS protocol disk interface and the SAS hard disk drive can be stored in the same device so as to be used without being discriminated.

Figure 2:
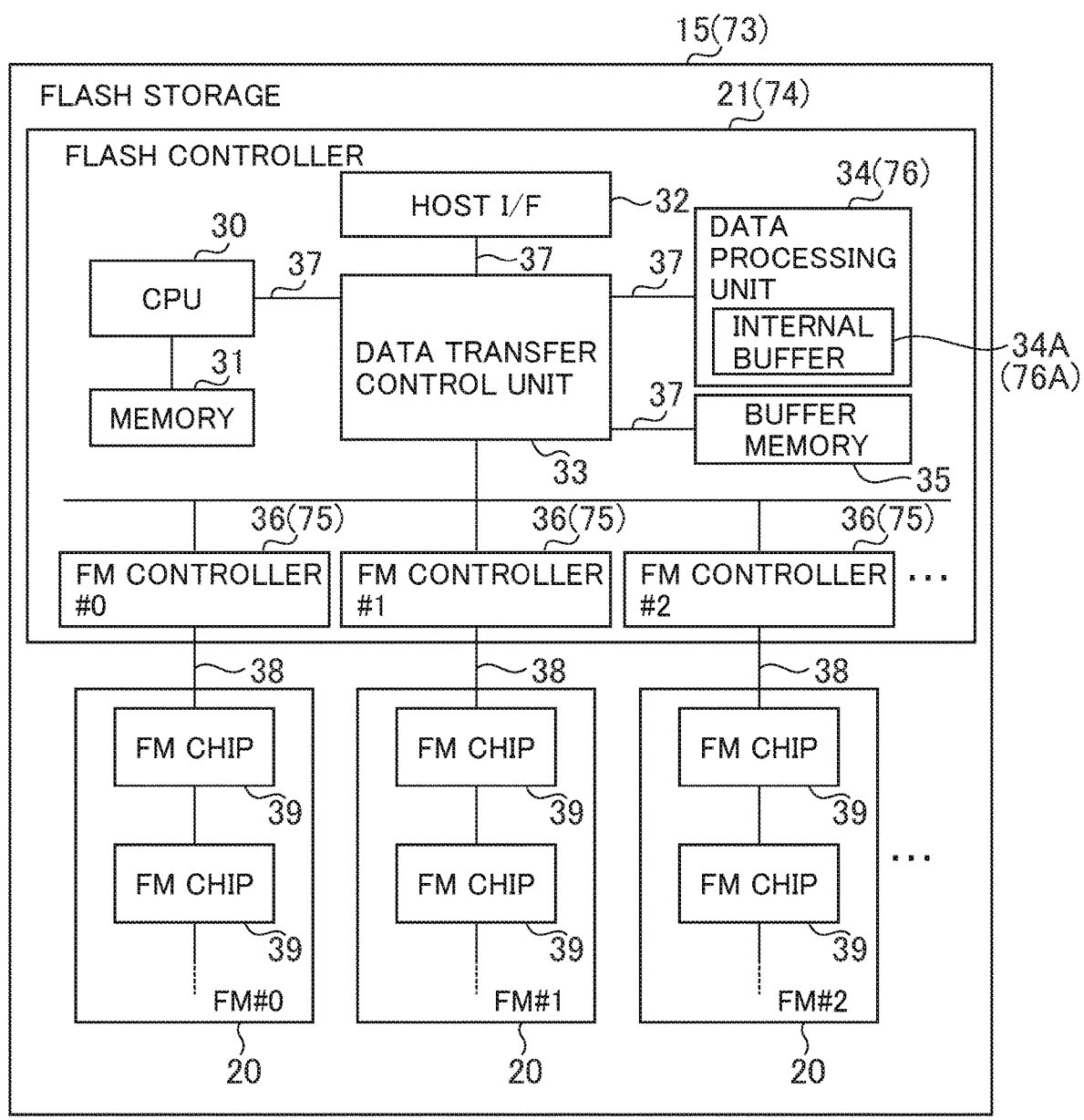
FIG. 2 is a block diagram illustrating the configuration of a flash storage according to the first and second embodiments.

FIG. 2 illustrates an example of the internal configuration of the flash storage 15. As is apparent from FIG. 2, the flash storage 15 has one or a plurality of flash memories 20, and a flash controller 21 that controls the reading and writing of data from and into these flash memories 20.

The flash controller 21 has a CPU 30, a memory 31, a host interface 32, a data transfer control unit 33, a data processing unit 34, a buffer memory 35, and a plurality of flash memory controllers 36.

The CPU 30 is a processor that controls the operation of the entire flash controller 21, and controls each of the host interface 32, the data transfer control unit 33, the data processing unit 34, and the respective flash memory controllers 36.

The memory 31 is mainly used for holding various programs and various data. The programs held in the memory 31 are executed by the CPU 30, so that the entire flash storage 15 executes various processes as described later.

The host interface 32 is an interface that performs protocol control during the communication with the higher-level device of the flash storage 15 (the RAID controller 10, or the host 2 when the RAID controller 10 is not present).

In addition, the data transfer control unit 33 has the function of switching the transfer source and the transfer destination of data between the CPU 30, the host interface 32, the data processing unit 34, and the buffer memory 35, and includes, for example, a PCIe (PCI (Peripheral Component Interconnect) Express) switch. The data transfer control unit 33 is connected to each of the CPU 30, the host interface 32, the data processing unit 34, and the buffer memory 35 via an internal bus 37.

The buffer memory 35 is mainly used for temporarily holding data read from the flash memory 20 and data written into the flash memory 20.

Each of the flash memory controllers 36 has the function of reading and writing data from and into the flash memory 20. In the following description, each of the flash memory controllers 36 is connected to one flash memory 20 via one flash memory bus 38. However, each of the flash memory controllers 36 may be connected to a plurality of flash memories 20 via a plurality of flash memory buses 38. Under the control of the CPU 30, the flash memory controller 36 reads data stored in the buffer memory 35 via the data transfer control unit 33, writes the read-out data into the flash memory 20 connected to the flash memory controller 36, or writes data read from the flash memory 20 into the buffer memory 35 via the data transfer control unit 33.

The data processing unit 34 has the function of processing or analyzing data read from and written into the flash memory 20. In this embodiment, as such processing or analyzing, the data processing unit 34 compresses or extends data. It is to be noted that the data processing unit 34 does not necessarily have a hardware configuration, and may have a software configuration embodied in such a manner that for example, the CPU 30 executes each program stored in the memory 31. When the data processing unit 34 has the software configuration, the memory 31 is not required to be the storing place for such program, and the CPU 30 is not required to mainly execute such program, and aside from the memory 31 and the CPU 30, a dedicated memory and a dedicated CPU may be provided.

On the other hand, the flash memory 20 has a plurality of flash memory chips 39 each having a storage area having a predetermined volume. The flash memory controller 36 reads and writes data from and into the storage areas provided by these flash memory chips 39.

It is to be noted that at least one of the components illustrated in FIG. 2 may be integrated with other elements. For example, a configuration that uses a chip in which the CPU 30, the host interface 32, the data transfer control unit 33, and each of the flash memory controllers 36 are integrated and a configuration that uses a chip in which the CPU 30, the host interface 32, the data transfer control unit 33, and each of the flash memory controllers 36 are integrated in part may be adopted. In addition, for example, a configuration that allows the memory 31 and the buffer memory 35 to be physically the same memory, and others, may be adopted.

Figure 3:
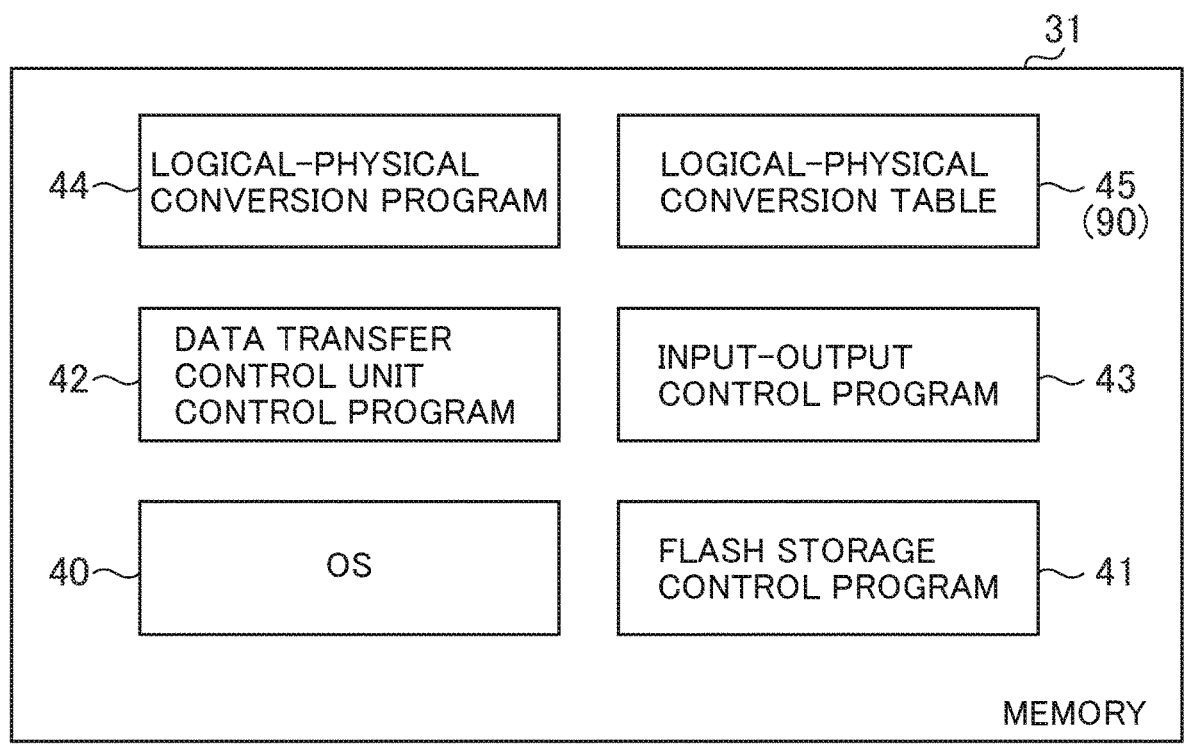
FIG. 3 is a block diagram of assistance in explaining programs and information stored in a memory of a flash controller.

FIG. 3 illustrates an example of programs and information stored in the memory 31 of the above-described flash controller 21. In this embodiment, the memory 31 stores, for example, an operating system 40, a flash storage control program 41, a data transfer control unit control program 42, an input-output control program 43, a logical-physical conversion program 44, and a logical-physical conversion table 45.

The operating system 40 is a program that performs the basic process, such as scheduling, when the CPU 31 (FIG. 2) executes each program. In addition, the flash storage control program 41 is a program used for control for operating the flash storage 15 as a storage device, such as the management of a volume provided to the higher-level device (the RAID controller 10 or the host 2) by the flash storage 15 (FIG. 2), and the management of the buffer memory 35 (FIG. 2).

The data transfer control unit control program 42 is a program used for controlling the data transfer control unit 33 (FIG. 2), and the input-output control program 43 is a program used for controlling the host interface 32 (FIG. 2) and each of the flash memory controllers 36 (FIG. 2).

The logical-physical conversion program 44 is a program that determines, in a conversion manner, the physical address on the flash memory 20 to which the logical address of the writing destination or the reading source designated by an IO request (a writing request or a reading request) issued from the higher-level device corresponds. It is to be noted that as the "logical address" referred in this embodiment, for example, an LBA (Logical Block Address) is applicable. The LBA is an address given to the logical block that is one of the management units of the storage area provided by each of the flash memory chips 39 of the flash memory 20. The detail of the logical block will be described later.

The logical-physical conversion table 45 is a table for managing the correspondence relation between the logical address and the physical address used when the logical-physical conversion program 44 is operated. The detail of the logical-physical conversion table 45 will be described later.

It is to be noted that other than the information illustrated in FIG. 3, the memory 31 stores information for controlling the host interface 32 and each of the flash memory controllers 36, and the like.

Figure 4:
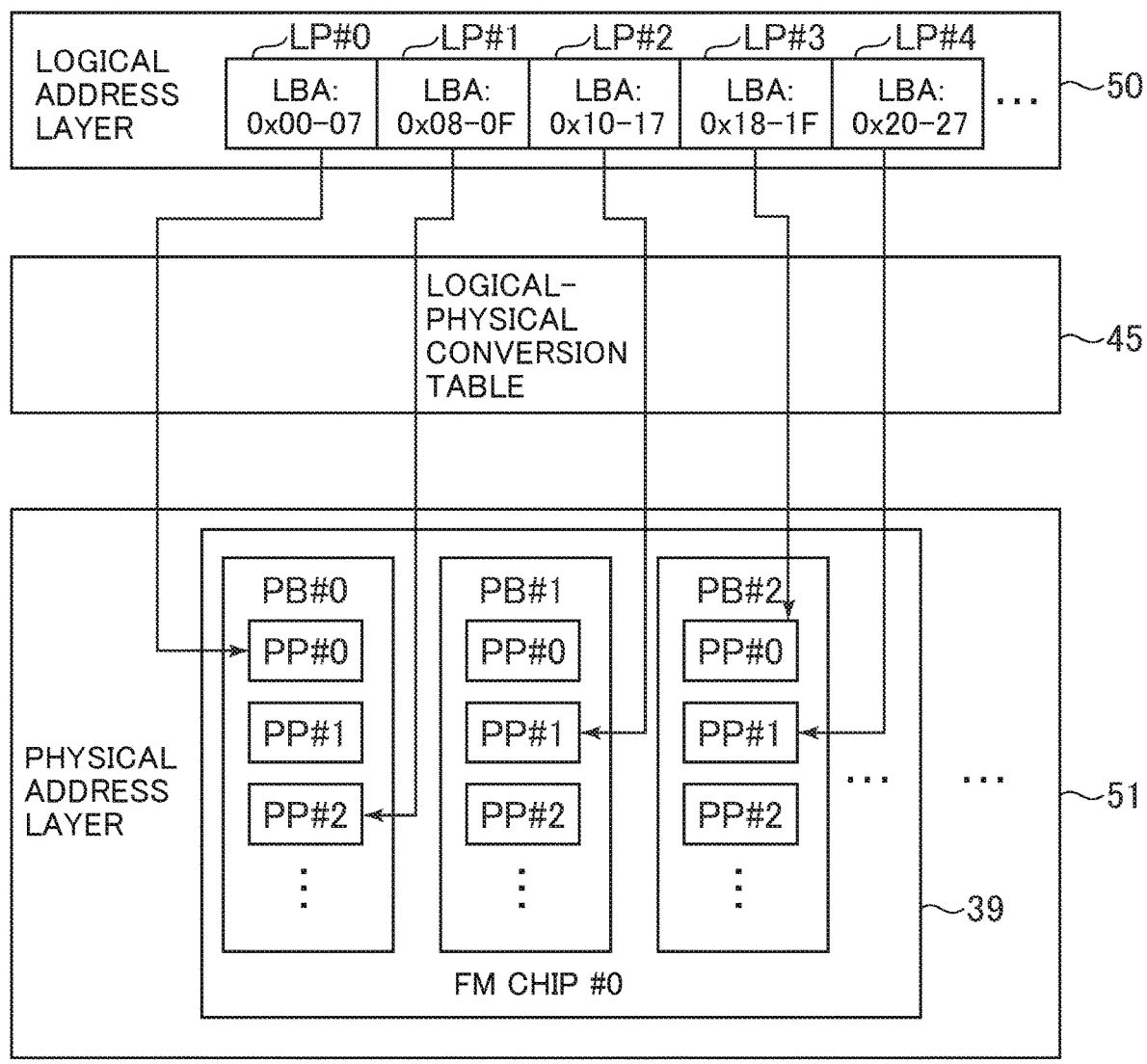
FIG. 4 is a concept diagram of assistance in explaining the logical-physical conversion process.

FIG. 4 illustrates an example of the outline of the logical-physical conversion process executed when the CPU 30 receives the IO request from the RAID controller 10 (the host 2 when the RAID controller 10 is not present) that is the higher-level device.

In FIG. 4, a logical address layer 50 has a logical storage area provided as the storage area to the higher-level device by the flash storage 15 (FIG. 2) (hereinafter, called a logical space). In the logical address layer 50, the logical space is managed so as to be sectioned into a plurality of logical pages LP (LP #1, LP #2, LP #3, ... in FIG. 4) that have a predetermined size and are each the reading and writing unit of data in the higher-level device of the flash storage 15. Each of the logical pages LP is given an address inherent to the logical page LP. In addition, each of the logical pages LP is further managed so as to be sectioned into a plurality of small areas that have a predetermined size and are each called a logical block. Each of these logical blocks is managed so as to be given an address inherent to the logical block (logical address), which is called the above-described LBA.

In addition, a physical address layer 51 has a physical storage area provided by each of the flash memory chips 39 in each of the flash memories 20. In the physical address layer 51, the physical storage area provided by the flash storage 15 is managed so as to be sectioned into a plurality of physical blocks PB (PB #1, PB #2, PB #3, ... in FIG. 4) that have a predetermined size and are each the erasing unit of data in the NAND flash memory. Each of the physical blocks PB is given an address inherent to the physical block PB. In addition, each of the physical blocks PB is managed so as to be further sectioned into a plurality of physical pages PP (PP #1, PP #2, PP #3, ... in FIG. 4) that have a predetermined size and are each the reading and writing unit of data in the flash storage 15. Each of these physical pages PP is given an address inherent to the physical page PP.

Here, to easily understand the description, the size of each of the logical pages LP and the size of each of the physical pages PP are the same. In addition, the size of each of the logical pages LP has eight logical blocks.

Each of the logical pages LP of the logical address layer 50 is associated with the corresponding physical page PP of the physical address layer 51 by the logical-physical conversion program 44 (FIG. 3). For example, FIG. 4 illustrates an example in which the logical page LP #0 including the logical blocks having the LBAs from "0x00" to "0x07" is allocated to the physical page PP #0 in the physical block PB #0 provided by the flash memory chip 39 given the identification number "#0". The correspondence relation between each of the logical pages LP and the physical page PP associated with the logical page LP is managed by using the logical-physical conversion table 45 that will be described in detail with reference to FIG. 8.

Upon receiving a reading request that designates the logical page LP transmitted from the higher-level device, the flash controller 21 (FIG. 2) of the flash storage 15 (FIG. 2) accepts the reading request, refers to such logical-physical conversion table 45 (FIG. 8) according to the reading request, reads data from the physical page PP associated with the logical page LP, and transfers the read-out data to the higher-level device.

It is to be noted that although typically, the size of the logical page LP and the size of the physical page PP are matched, there is the case where the size of the logical page LP and the size of the physical page PP are not matched.

Figure 5:
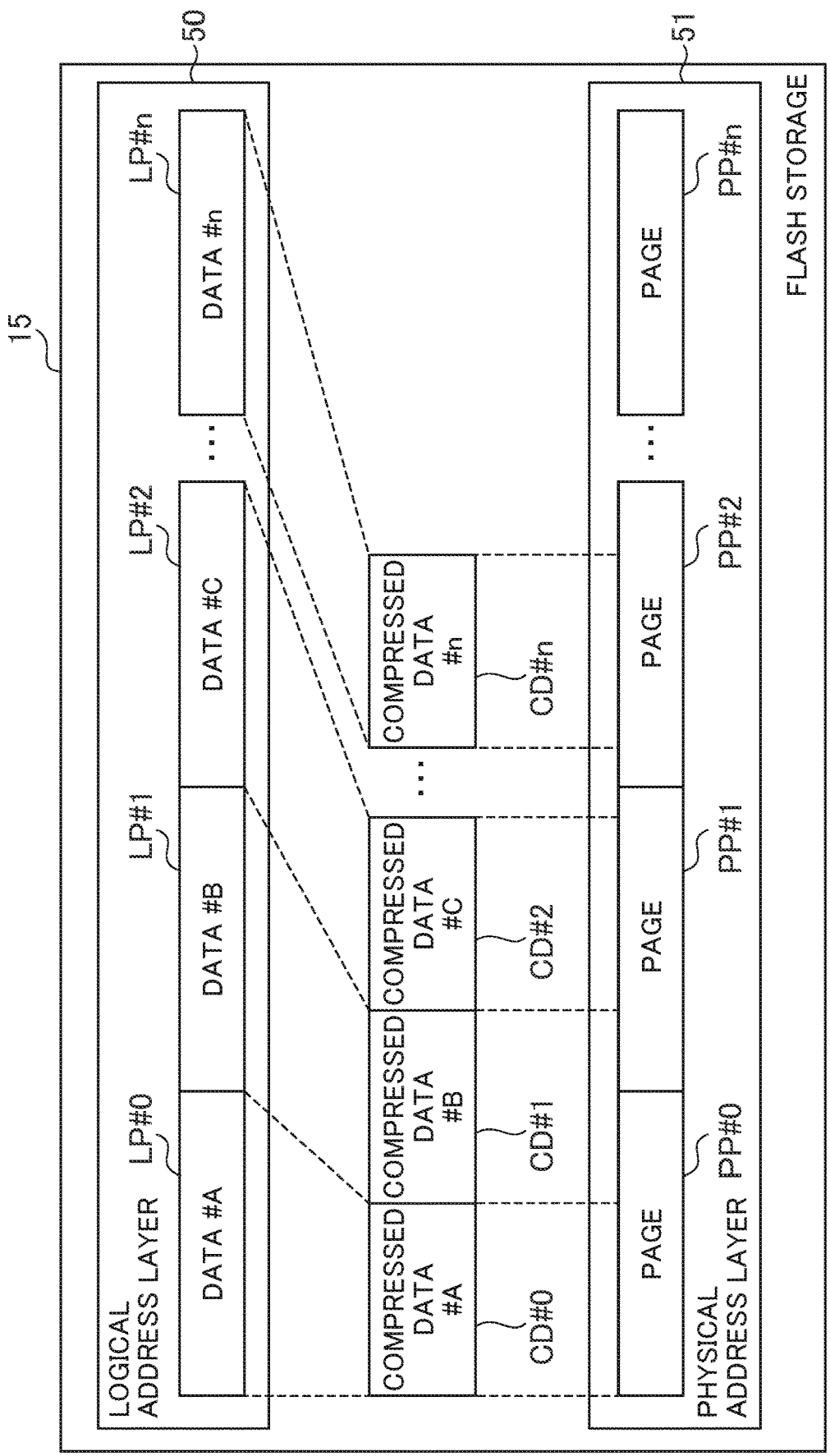
FIG. 5 is a concept diagram illustrating the relation between the data length of data stored in each logical page, the data length of its compressed data, and the size of the corresponding physical page.

FIG. 5 illustrates the relation between each of compressed data CD (CD #0 to CD # n in FIG. 5) obtained by subjecting writing target data to the compression process for each of the logical pages LP by using the data compression function of the flash storage 15 and the physical page PP into which the compressed data CD is written.

Typically, writing target data is given together with a writing request including the address of the logical page LP for the writing destination at the head and the data length of the writing target data. Then, the writing target data is divided into data for each of the logical pages LP, and the data in the respective logical pages LP are respectively converted to the compressed data CD (CD #0 to CD # n) having a smaller data size than the respective corresponding logical pages LP. The compression rate is changed according to the data pattern and the like, so that the respective compressed data CD are not necessarily uniform in size.

In this case, for example, the compressed data CD #2 provided by compressing the data in the logical page LP #2 in FIG. 5 is stored across the physical page PP #0 and the physical page PP #1. It is to be noted that although FIG. 5 illustrates an example in which to increase the rate of the effective data in the physical page PP #0, the data in the logical page LP #2 is stored across the physical page PP #0 and the physical page PP #1, the compressed data CD #0 and the compressed data CD #1 may be stored in the physical page PP #0, invalid data, for example, zero data, may be stored, and the data in the logical page LP #2 may be stored from the head of the physical page PP #1.

The CPU 30 can achieve wear leveling and the like by dynamically changing the mapping of the address in the logical address layer 50 (the address of the logical page LP) and the address in the physical address layer 51 (the address of the physical page PP).

Figure 6:
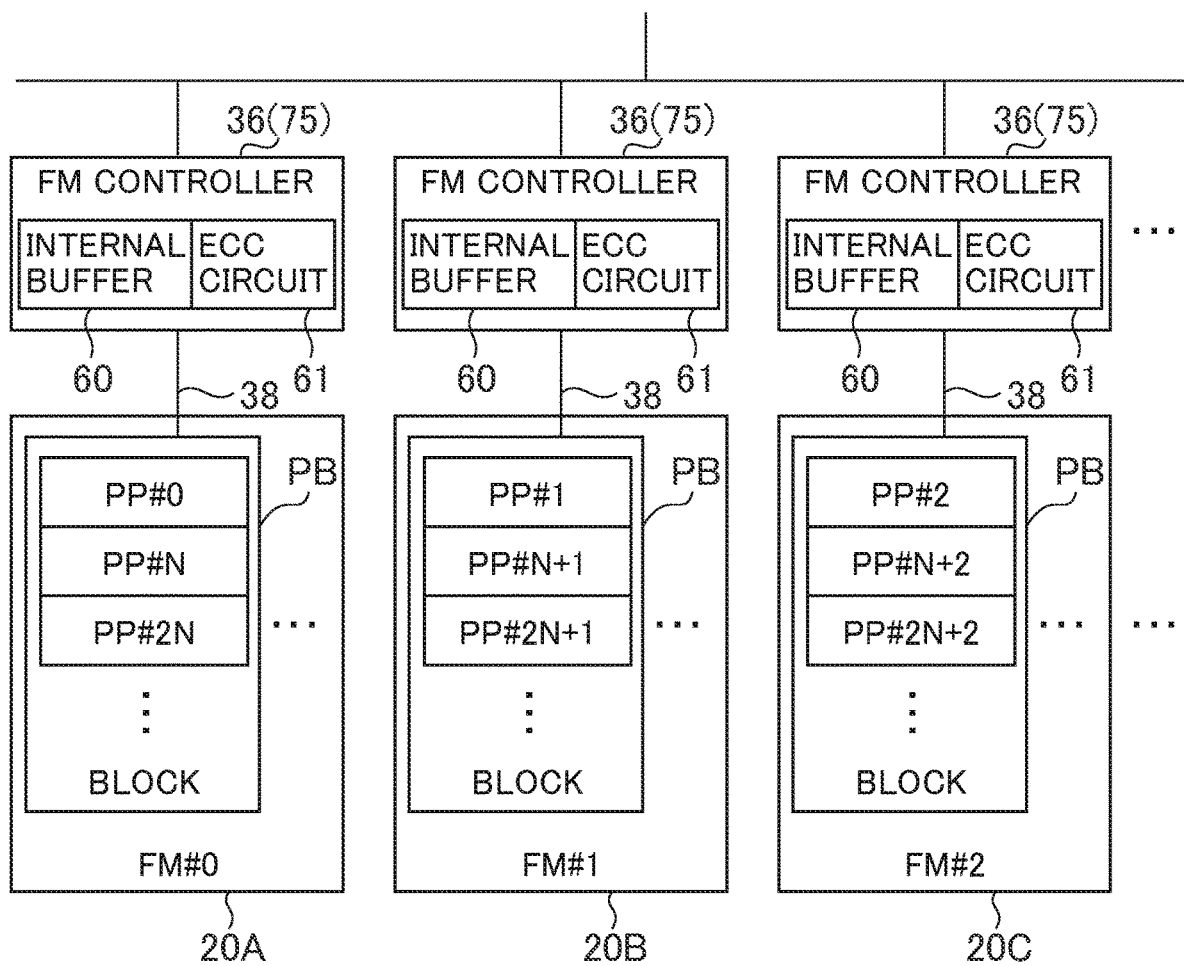
FIG. 6 is a block diagram illustrating the relation between each physical address space of the flash storage and each flash memory controller.

FIG. 6 illustrates the relation between each physical address space of the flash storage 15 (FIG. 2) and each of the flash memory controllers 36. Each of the flash memory controllers 36 has an internal buffer 60 and an ECC circuit 61. In FIG. 6, each of the physical pages PP corresponds to each of the physical pages PP in FIG. 5.

Here, when the data in one logical page is stored across a plurality of physical pages, the data is not written into one flash memory 20, and is ideally distributed and stored into a plurality of flash memories 20. This is because since the flash storage 15 can perform the IO process (the writing process and the reading process) in parallel with the plurality of flash memories 20, the writing of the data so as to distribute the data into the plurality of flash memories 20 is advantageous in terms of throughput.

Thus, also in this embodiment, the first half portion of the compressed data CD #2 in FIG. 5 is given to the flash memory controller 36 having the identifier "#0" and is stored in the physical page PP #0, and the latter half portion of the compressed data CD #2 is given to the flash memory controller 36 having the identifier "#1" and is stored in the physical page PP #1. That is, the compressed data CD #2 is stored across two flash memories 20 (20A, 20B).

However, the addresses of the physical pages PP are continuous across the flash memory controllers 36. For example, the address of the physical page PP #0 managed by the flash memory controller 36 having "#0" is "#0", the physical page PP #1 whose address is "#1" is the physical page managed by the flash memory controller 36 having the identifier "#1".

For this assumption, in this embodiment, "page straddling" represents a state where the data in one logical page is divided and stored into a plurality of flash memories 20.

It is to be noted that in the following description, the correspondence relation between the address of the physical page PP and the flash memory controller 36 controlling the reading and writing of data from and into the flash memory 20 providing the physical page PP is uniquely determined, but may be managed by a table. Alternatively, an address conversion layer may be provided between flash memory controller 36 and flash memory 20 and be virtually managed. In addition, the correspondence relation between the address of the physical page PP and the flash memory controller 36 can be dynamically and statically updated.

By the way, when as described above, the data in one logical page is distributed and stored into a plurality of flash memories 20, the distributed data are required to be integrated into the original one data on the buffer memory 35 (FIG. 2) and the resulting data is required to be subjected to the extension process in the data processing unit 34 (FIG. 2), so that the buffer memory 35 is required to be used, and such use of the buffer memory 35 excessively uses the bandwidth of the buffer memory 35, with the result that there is a fear of lowering the performance of the flash storage 15 (FIG. 2) and the flash storage device 11 (FIG. 1).

Accordingly, in this embodiment, when reading target data is stored across two flash memories 20, the data read from the flash memories 20 is given to the data processing unit 34 via the buffer memory 35, whereas when the data is stored in one flash memory 20, the data is directly given to a data processing unit 34 not via the buffer memory 35, so that the amount of data inputted to and outputted from the buffer memory 35 is reduced, thereby preventing the lowering of the performance of the flash storage 15 due to the excessive use of the bandwidth of the buffer memory 35.

The flow of the IO process (the writing process and the reading process) in such computer system 1 (FIG. 1) of this embodiment will be described below. It is to be noted that in the following description, to simply understand the flow of the IO process, the data length of writing target data targeted by one writing request is equal to the data size for one logical page.

(1-2) The Flow of the IO Process in the Computer System

First, the flow of the writing process will be described. Typically, the writing process is started when the flash controller 21 (FIG. 2) receives a writing request from the higher-level device. The CPU 30 receives the writing request and writing target data from the higher-level device by the input-output control program 43 (FIG. 3). The writing request includes the address of the logical page for the writing destination of the writing target data.

Figure 7:
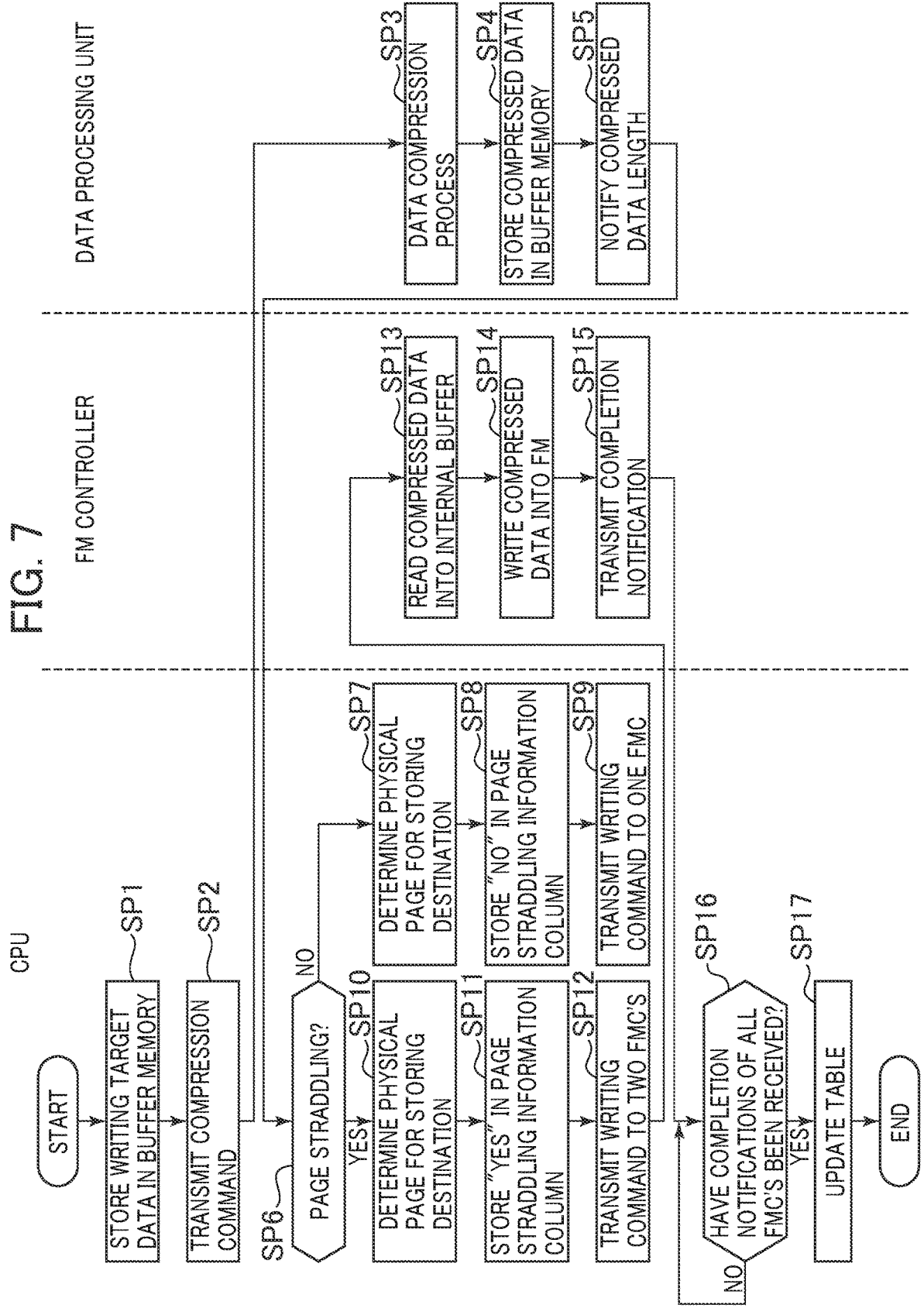
FIG. 7 is a flowchart illustrating the flow of the writing process in the flash storage according to the first embodiment.

FIG. 7 illustrates an example of the flow of the writing process executed in the flash storage 15. When the flash storage 15 receives writing target data and a writing request from the higher-level device, the CPU 30 first stores the writing target data received at that time in the buffer memory 35 (FIG. 2) (SP1). In this case, the writing target data is recognized as the data in the logical page LP for the writing destination.

Subsequently, the CPU 30 designates the writing target data stored in the buffer memory 35 in step SP1, and transmits, to the data processing unit 34 (FIG. 2), a compression command to subject the writing target data to the compression process (SP2). Thus, upon receiving this compression command, the data processing unit 34 executes the data compression process for compressing the writing target data stored in the buffer memory 35 (SP3), and stores the thus obtained compressed data in the buffer memory 35 (SP4). In addition, the data processing unit 34 transmits, to the CPU 30, a completion notification including the data length of such compressed data (SP5).

Upon receiving such completion notification, the CPU 30 determines whether or not the page straddling occurs when the compressed data is stored in the flash memory 20 (SP6). Specifically, the CPU 30 determines each of the case where the compressed data of the data satisfies the following equation and the case where the compressed data of the data does not satisfy the following equation:

[Equation 1]

$$\text{the size of the physical page} < \text{the offset amount of the compressed data} + \text{the data length of the compressed data} \qquad (1).$$

When the compressed data satisfies Equation (1), the CPU 30 determines that the page straddling occurs, and when the compressed data does not satisfy Equation (1), the CPU 30 determines that the page straddling does not occur. It is to be noted that "the offset amount of the compressed data" means the offset amount from the head of the physical page in the position into which the compressed data is written, in the physical page into which the compressed data is written.

For example, in the case of the example in FIG. 5, when the length of the physical page PP is "3" and the data lengths of the compressed data CD #0 and CD #1 are both "1", the offset of the compressed data CD #0 is "0" and the offset of the compressed data CD #1 is "1", so that it is determined that there is not the page straddling in the compressed data CD #0 and CD #1. In addition, the data length of the compressed data CD2 is "2", the offset of the compressed data CD #2 is "2", so that it is determined that there is the page straddling in the compressed data CD #2.

Then, when obtaining a negative result in the determination in step SP6, the CPU 30 determines one physical page for the storing destination of the compressed data (SP7), and based on the determination result, the logical-physical conversion table 45 (FIG. 8) is updated (SP8).

Here, as illustrated in FIG. 8, the logical-physical conversion table 45 has a logical page address column 45A, a physical page address column 45B, a data offset column 45C, a data length column 45D, and a page straddling information column 45E.

And, the logical page address column 45A stores the address given to each logical page, and the physical page address column 45B stores the address given to the physical page associated with the corresponding logical page. In addition, the data offset column 45C stores the offset amount of the compressed data stored in the corresponding physical page from the head of the physical page, and the data length column 45D stores the data length of the compressed data.

Further, the page straddling information column 45E stores the information that represents whether or not such compressed data is stored across a plurality of physical pages (the information about whether or not data straddling occurs, and hereinafter, is called data straddling information). Specifically, the page straddling information column 45E stores "YES" when the page straddling occurs in the compressed data, and stores "NO" when the page straddling does not occur in the compressed data.

Therefore, in step SP8, in the logical-physical conversion table 45, the CPU 30 stores "NO" in the page straddling information column 45E in the row in which the address of the logical page for the writing destination of the writing target data is stored in the logical page address column 45A.

It is to be noted that in the logical-physical conversion table 45, the page straddling information column 45E can be omitted. This is because as described later, whether or not there is the page straddling in the corresponding compressed data can be determined by calculation from the data length of the compressed data. In this case, the process in step SP8 is omitted.

Subsequently, the CPU 30 transmits, to the corresponding flash memory controller 36, a writing command that designates the compressed data to be written, which is stored in the buffer memory 35 and the physical page determined as the writing destination of the data in step SP7 (SP9), and then, the routine goes to step SP13. It is to be noted that "the corresponding flash memory controller" referred herein is referred to as the flash memory controller 36 controlling the flash memory 20 having the flash memory chip 39 (FIG. 2) providing the physical page. This is the same for the following.

On the contrary, when obtaining a positive result in the determination in step SP6, the CPU 30 determines each of the physical page for the storing destination of the first half portion of the compressed data and the physical page for the storing destination of the latter half portion of the compressed data (SP10). In this case, the CPU 30 determines, as the physical pages for the storing destinations of the first half portion and the latter half portion of the compressed data, two physical pages provided by the respective different flash memories 20.

In addition, based on such determination result, in the logical-physical conversion table 45, the CPU 30 stores "YES" in the page straddling information column 45E in the row in which the address of the logical page for the writing destination of the writing target data is stored in the logical page address column 45A (SP11). It is to be noted that as described above, when the page straddling information column 45E of the logical-physical conversion table 45 is omitted, the process in step SP11 is also omitted.

Subsequently, the CPU 30 transmits, to the corresponding flash memory controller 36, a writing command that designates the physical page determined as the storing destination of the first half portion of the compressed data in step SP10 and the first half portion of the compressed data stored in the buffer memory 35 (the portion from the head of the compressed data, the portion having the largest amount of data that can be stored in the physical page determined as the storing destination of the first half portion of the compressed data). In addition, the CPU 30 transmits, to the corresponding flash memory controller 36, a writing command that designates the physical page determined as the storing destination of the latter half portion of the compressed data in step SP10 and the latter half portion of the compressed data stored in the buffer memory 35 (the remaining portion of the compressed data) (SP12).

Then, each of the flash memory controllers 36 that have received such writing commands reads the first half portion or the latter half portion of the compressed data designated by the corresponding writing command, from the buffer memory 35 into the internal buffer 60 (FIG. 6) in the interior of the flash memory controller 36 (SP13), and writes the read first half portion or latter half portion of the compressed data, into the physical page designated as the writing destination by the writing command given from the CPU 30 at that time, in the flash memory 20 controlled by the flash memory controller 36 (SP14).

In addition, the flash memory controller 36 then transmits, to the CPU 30, a completion notification to notify that the writing of the compressed data has been completed (SP15). It is to be noted that in this case, the address in the physical page in which the flash memory controller 36 stores the compressed data at that time (for example, "0", "1", and the like) may be notified to the CPU 30. However, the notification of the physical page address of the latter half portion of the compressed data in which the page straddling occurs can be omitted. This is applicable when the entire data cannot be stored in a physical page, another physical page in which the continuation of the data is stored is previously determined.

At this time, the CPU 30 waits for the transmission of the completion notifications from all the flash memory controllers 36 that have transmitted the writing commands in step SP9 or step SP12 (SP16).

Then, when completing the reception of the completion notifications from all the flash memory controllers 36 that have transmitted the writing commands in step SP9 or step SP12, the CPU 30 updates the logical-physical conversion table 45 according to the contents of the process that has been performed until now (SP17).

Specifically, in the logical-physical conversion table 45, the CPU 30 stores the address of the physical page determined in step SP10 at that time, in the physical page address column 45B in the row in which the address of the logical page for the writing destination of the writing target data is stored in the logical page address column 45A. In addition, the CPU 30 stores the offset amount from the head of such physical page when the compressed data of the writing target data is written into the physical page, in the data offset column 45C in the row, and stores the data length of the compressed data in the data length column 45D in the row (SP17). It is to be noted that together with this, in step SP17, the content of the page straddling information column 45E in the corresponding row in the logical-physical conversion table 45 may be updated. In that case, steps SP8 and SP11 are not required. Then, the CPU 30 ends the sequence of these processes, so that the sequence of the processes to the writing request from the higher-level device received at this time is ended.

It is to be noted that although here, for simplification, the CPU 30 directly designates the physical address, the flash memory controller 36 may determine the physical address of the storing destination of the compressed data, and notify the determined physical address to the CPU 30. In that case, the CPU 30 determines the flash memory controller 36 that stores the data in the logical page.

Figure 9:
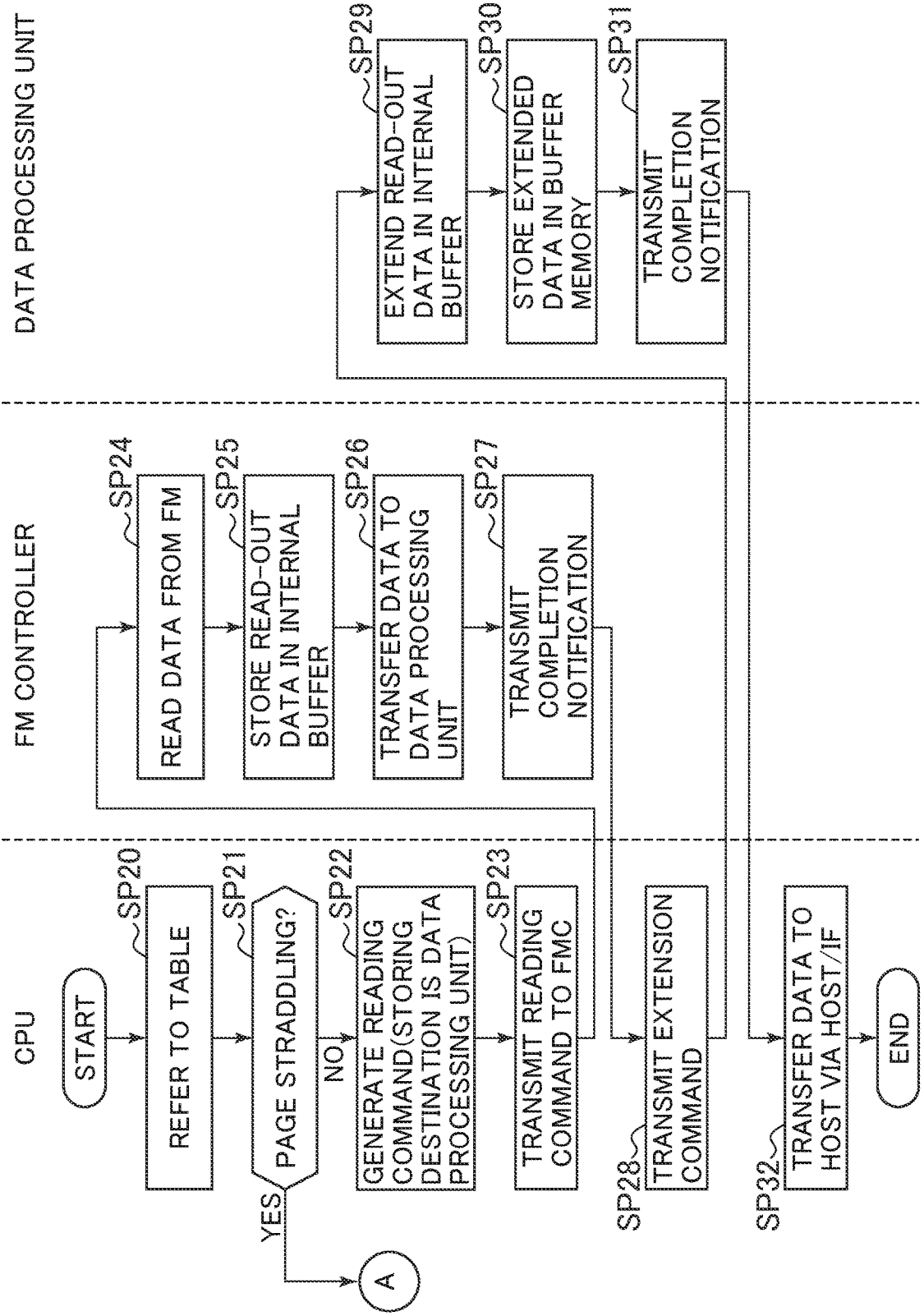
FIG. 9 is a flowchart illustrating the flow of the reading process in the flash storage according to the first embodiment.
Figure 10:
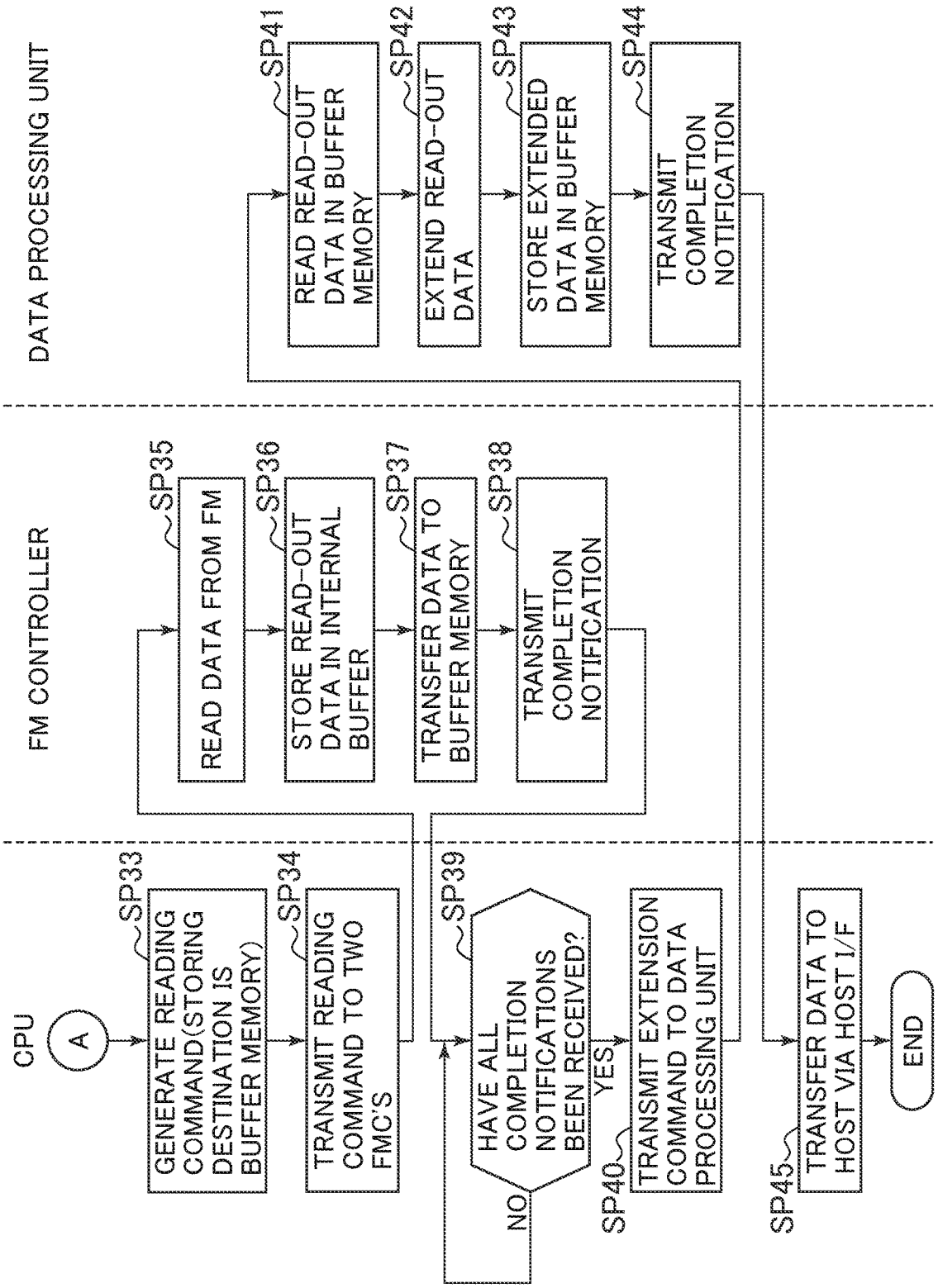
FIG. 10 is a flowchart illustrating the flow of the reading process in the flash storage according to the first embodiment.

On the other hand, FIGS. 9 and 10 illustrate examples of the flows of the reading process executed in the flash storage 15. This reading process is started when the flash storage 15 receives a reading request that is given from the higher-level device, for example, the host 2 and includes the address of the logical page in which data to be read (hereinafter, called reading target data) is stored.

Actually, when the flash storage 15 receives the reading request from the higher-level device, the CPU 30 first refers to the logical-physical conversion table 45 (FIG. 8), obtains the value of the page straddling information stored in the page straddling information column 45E in the row corresponding to the logical page designated as the reading source of the reading target data by the reading request (SP20), and determines, based on the obtained value of the page straddling information, whether or not the reading target data is stored across two physical pages (whether or not the value of the page straddling information is "YES") (SP21).

It is to be noted that when as described above, the page straddling information column 45E of the logical-physical conversion table 45 is omitted, it can be determined, from Equation (1) described above, whether or not the reading target data is stored across two physical pages, based on the data offset amount stored in the data offset column 45C (FIG. 8) in the row corresponding to the logical page designated as the reading source of the data by the reading request, among the respective rows of the logical-physical conversion table 45, the data length stored in the data length column 45D (FIG. 8) in the same row, and the previously set data length of the physical page.

Then, when obtaining a negative result in the determination in step SP21, the CPU 30 generates a reading command that designates an internal buffer 34A (FIG. 2) of the data processing unit 34 as the storing destination of the reading target data (SP22), and transmits the generated reading command to the corresponding flash memory controller 36 (SP23). It is to be noted that "the corresponding flash memory controller" referred herein is referred to as the flash memory controller 36 controlling the flash memory 20 having the flash memory chip 39 providing the physical page in which the compressed reading target data is stored. This is the same for the following.

The flash memory controller 36 that has received this reading command reads the reading target data from the flash memory 20 according to the received reading command (SP24), and stores, as read-out data, the read reading target data in the internal buffer 60 (FIG. 6)(SP25).

Subsequently, the flash memory controller 36 transfers the read-out data stored in such internal buffer 60, to the data processing unit 34 designated as the storing destination by the reading command (SP26). Then, upon receiving such read-out data, the data processing unit 34 stores the read-out data in the internal buffer 34A (FIG. 2). In addition, the flash memory controller 36 then transmits a completion notification to the CPU 30 (SP27).

The CPU 30 that has received this completion notification transmits, to the data processing unit 34, an extension command to extend the read-out data stored in the internal buffer 34A (SP28).

Upon receiving this extension command, the data processing unit 34 executes the extension process to the read-out data (SP29), and stores the extended read-out data (hereinafter, called extended data, as needed) in the buffer memory 35 (FIG. 2) (SP30). Then, the data processing unit 34 transmits a completion notification to the CPU 30 (SP31).

Upon receiving such completion notification, the CPU 30 allows the host interface 32 (FIG. 2) to read the above-described extended read-out data stored in the buffer memory 35 via the data transfer control unit 33 (FIG. 2), and to transmit the read read-out data to the host 2 for the transmission source of the reading request (SP32). From the above, the sequence of the reading processes is ended.

It is to be noted that in step SP28, the buffer memory (not illustrated) in the host interface 32 may be designated as the storing destination of the extended data by the extension command transmitted to the data processing unit 34 by the CPU 30.

In addition, in step SP27, the flash memory controller 36 may transmit the completion notification to the data processing unit 34, not to the CPU 30. In this case, the flash memory controller 36 is required to issue the above-described extension command in step SP28 to the data processing unit 34 together with such completion notification.

On the contrary, when obtaining a positive result in the determination in step SP21, as illustrated in FIG. 10, the CPU 30 generates a reading command that designates the address on the buffer memory 35 as the reading source of the reading target data (SP33), and transmits the generated reading command to corresponding two flash memory controllers 36 (SP34).

Specifically, the CPU 30 generates a reading command with respect to the first half portion of the compressed reading target data, and transmits the generated reading command to the flash memory controller 36 controlling the flash memory 20 having the flash memory chip 39 providing the physical page in which the first half portion is stored. In addition, the CPU 30 generates a reading command with respect to the latter half portion of the compressed reading target data, and transmits the generated reading command to the flash memory controller 36 controlling the flash memory 20 providing the physical page in which the latter half portion is stored.

Then, each of the flash memory controllers 36 that have received these reading commands reads each of the first half portion and the latter half portion of the reading target data from the buffer memory 35 according to each of the received reading commands (SP35), and stores, as read-out data, each of the first half portion and the latter half portion of the read reading target data in the internal buffer 60 (FIG. 6) (SP36).

In addition, each of these flash memory controllers 36 transfers the read-out data stored in the internal buffer 60 to the buffer memory 35 in such a manner that the address on the buffer memory 35 designated as the storing destination by the reading command received at that time is designated as the writing destination (SP37). Thus, the read-out data respectively transferred from the respective flash memory controllers 36 (the first half portion and the latter half portion of the compressed data) are respectively stored in the address positions designated by the respective corresponding reading commands in the buffer memory 35, and are integrated on the buffer memory 35. This restores the original compressed data. Then, each of the flash memory controllers 36 transmits a completion notification to the CPU 30 (SP38).

On the other hand, after the process in SP34, the CPU 30 waits for the transmission of the completion notifications from all the flash memory controllers 36 that have transmitted the reading commands (SP39). Then, when the completion notifications from all the flash memory controllers 36 that have transmitted the reading commands are transmitted, the CPU 30 transmits, to the data processing unit 34, an extension command to extend the above-described read-out data (compressed data) stored in the buffer memory 35 (SP40). It is to be noted that this extension command stores the address on the buffer memory 35 into which the extended read-out data is to be written.

Upon receiving this extension command, the data processing unit 34 reads the above-described read-out data (compressed data) stored in the buffer memory 35 into the internal buffer 34A (FIG. 2) of the data processing unit 34 (SP41), and executes the data extension process for subjecting the read read-out data to the extension process (SP42). In addition, the data processing unit 34 stores the thus extended read-out data in the address position on the buffer memory 35 designated by the extension command (SP43), and then, transmits a completion notification to the CPU 30 (SP44).

Upon receiving such completion notification, the CPU 30 controls the host interface 32 (FIG. 2) so that the host interface 32 reads the above-described extended read-out data stored in the buffer memory 35 and transmits the read read-out data to the host 2 for the transmission source of the reading request (SP45). Then, the CPU 30 ends the sequence of these reading processes.

It is to be noted that in the sequence of the processes illustrated in FIG. 10, for example, when the read-out data is not compressed, the transfer of the read-out data read from the flash memory 20 to the data processing unit 34 can be omitted. In this case, after receiving the completion notifications from the two flash memory controllers 36 (SP39), the CPU 30 controls these two flash memory controllers 36 so that the flash memory controllers 36 immediately transfer the read-out data read from the flash memory 20 to the host interface 32.

(1-3) The Effects of this Embodiment

Figure 11:
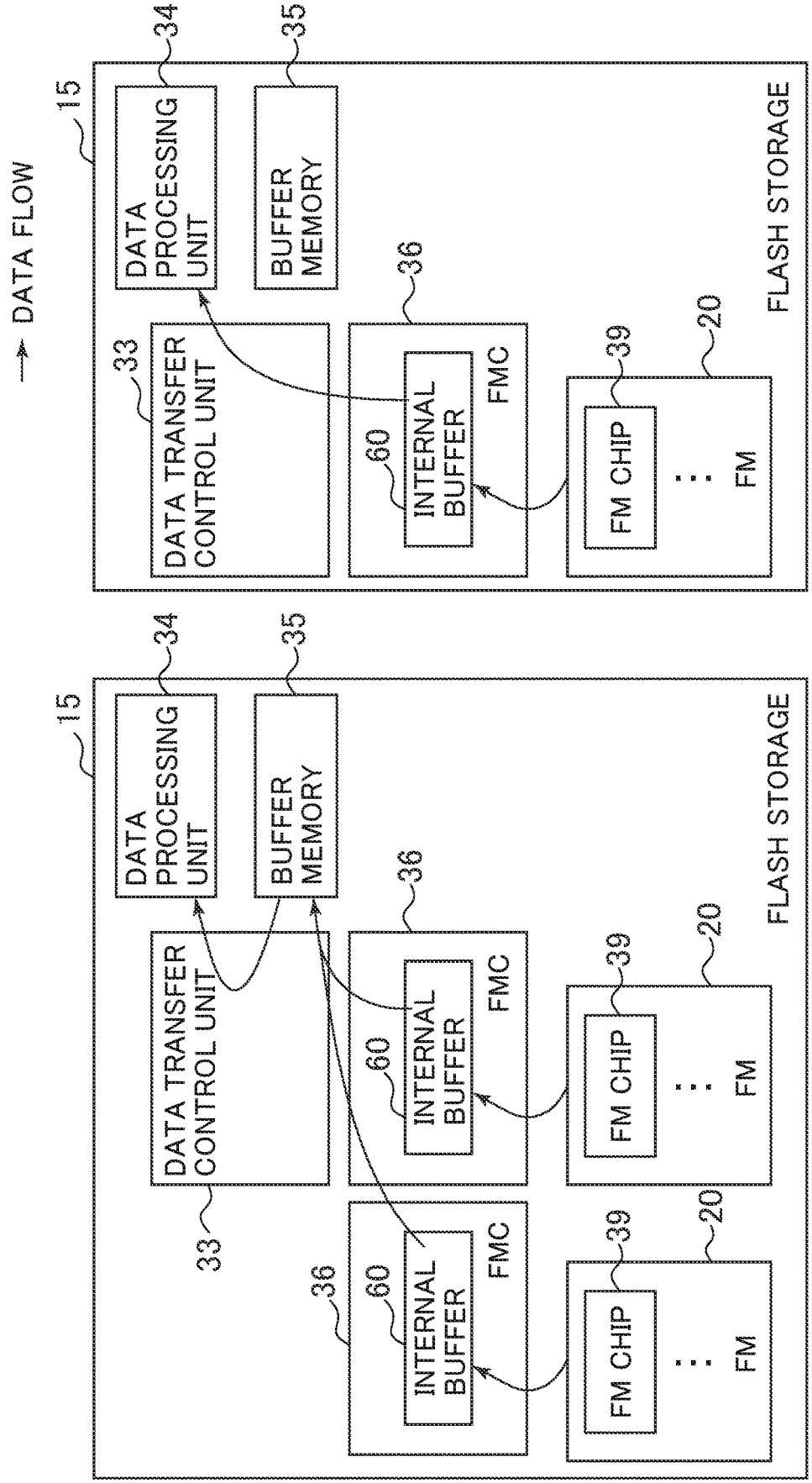
FIG. 11(A) is a concept diagram illustrating the data flow when there is page straddling.
FIG. 11(B) is a concept diagram illustrating the data flow when there is not page straddling.

In the computer system 1 of this embodiment having the above configuration, when reading target data is stored across two flash memories 20, as illustrated in FIG. 11(A), the read-out data is given to the data processing unit 34 via the buffer memory 35 in the interior of the flash storage 15 (FIG. 2) in a conventional manner. Then, this read-out data is subjected to the data extension process in the data processing unit 34, is transferred to the host interface 32 via the buffer memory 35, and is transmitted to the higher-level device by the host interface 32.

On the contrary, when reading target data is stored in one flash memory 20 (the page straddling does not occur), as illustrated in FIG. 11(B), the read-out data is directly given from the flash memory controller 36 to the data processing unit 34 not via the buffer memory 35. Then, this read-out data is subjected to the extension process in the data processing unit 34, is transferred to the host interface 32 via the buffer memory 35, and is transmitted to the higher-level device by the host interface 32.

Therefore, according to the computer system 1, the amount of data inputted to and outputted from the buffer memory 35 can be efficiently reduced, and a bottleneck in performance due to the excessive use of the bandwidth of the buffer memory 35 can be improved, so that the lowering of the performance of the flash storage 15 can be effectively prevented.

(2) Second Embodiment

In FIG. 1, the reference sign 70 denotes a computer system according to a second embodiment in its entirety. The computer system 70 is different from the computer system 1 according to the first embodiment in that each flash memory controller 75 (FIG. 2) of a flash storage 73 (FIG. 2) executes the ECC process for adding an ECC to writing target data by using the ECC circuit 61 (FIG. 6) provided in the interior of the flash memory controller 75, and the error correction process for correcting, based on the ECC given to read-out data, the error of the read-out data, as needed.

In addition, the computer system 70 according to this embodiment is also different from the computer system 1 according to the first embodiment in that the data processing unit 76 (FIG. 2) of the flash storage 73 subjects writing target data and read-out data to other data processes except for the data compression process and the data extension process. Although in the following description, the data processing unit 76 subjects writing target data and read-out data to the encoding process and the decoding process, the data processing unit 76 may execute other data processes except for the encoding process and the decoding process. Alternatively, the data processing unit 76 can be allowed to perform no data process to writing target data and read-out data. For example, the data processing unit 76 may directly transfer read-out data transferred from the flash memory controller 75 to the host interface 32 (FIG. 2).

It is to be noted that in the following, the data size of writing target data is not changed by the encoding process and the decoding process. Therefore, in this embodiment, there is the problem of changing the data length of writing target data encrypted by the data processing unit 76 (hereinafter, called encrypted data), to which the ECC is added by the ECC circuit 61 of each flash memory controller 75 of the flash storage 73.

Figure 12:
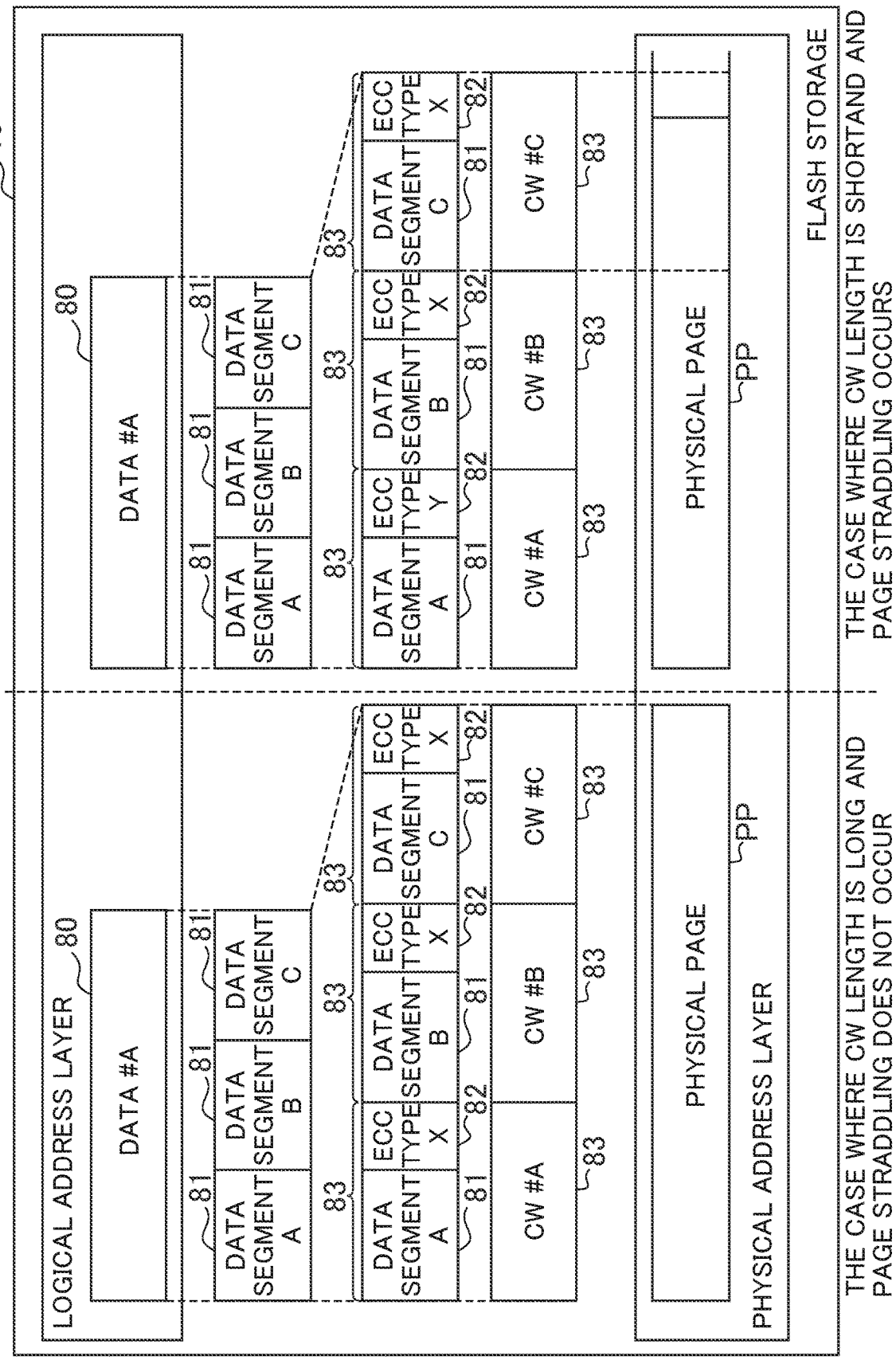
FIG. 12 is a concept diagram illustrating the relation between the data length in which ECCs are added to each writing target data and the corresponding physical page.

FIG. 12 illustrates the relation between the data length when ECCs are added to each encrypted data 80 and the corresponding physical page PP. The ECC circuit 61 of the flash memory controller 75 divides the encrypted data 80 for one logical page into a plurality of data segments 81 having a predetermined size, and adds, to each of these data segments 81, an ECC according to the content of the data segment 81. The data segment 81 and an ECC 82 are combined to be a code word (CW) 83. In the code word 83, the ratio between the data segment 81 and the ECC 82 is changed according to the error correction ability of the ECC. It is to be noted that the right side in FIG. 12 illustrates the case where the strong ECCs 82 are added, and the left side in FIG. 12 illustrates the case where the ECCs 82 weaker than the ECCs 82 on the right side are added.

In this case, as illustrated on the right side in FIG. 12, when the strong ECC 82 is added to each of the data segments 81, the data length of each code word 83 is increased, or the number of code words per logical page is increased, so that the data 80 for one logical page may be stored in a plurality of physical pages PP. Also in this case, likewise, the page straddling in which the encrypted data 80 is stored across a plurality of physical pages PP may occur.

FIG. 13 illustrates the structure example of a logical-physical conversion table 90 according to the second embodiment. As illustrated in FIG. 13, the logical-physical conversion table 90 has a logical page address column 90A, a physical page address column 90B, a data offset column 90C, an ECC type column 90D, and a page straddling information column 90E.

And, each of the logical page address column 90A, the physical page address column 90B, the data offset column 90C, and the page straddling information column 90E stores the same information as the information stored in the corresponding column in the logical-physical conversion table 45 according to the first embodiment described above with reference to FIG. 8 (the logical page address column 45A, the physical page address column 45B, the data offset column 45C, or the page straddling information column 45E).

In addition, the ECC type column 90D stores the ECC type used when ECCs are added to the encrypted data in the corresponding logical page, such as BCH (Bose Chaudhuri Hocquenghem) and LDPC (Low-Density Parity Check).

However, when the ECC type used is uniquely determined, the ECC type column 90D may be omitted. In addition, instead of being different in code type, the ECCs may simply be different in code rate. Further, the page straddling information column 90E can be omitted. This is because as described in the first embodiment, whether or not there is the page straddling in the corresponding encrypted data can be determined by calculation from the data length of the encrypted data.

Figure 14:
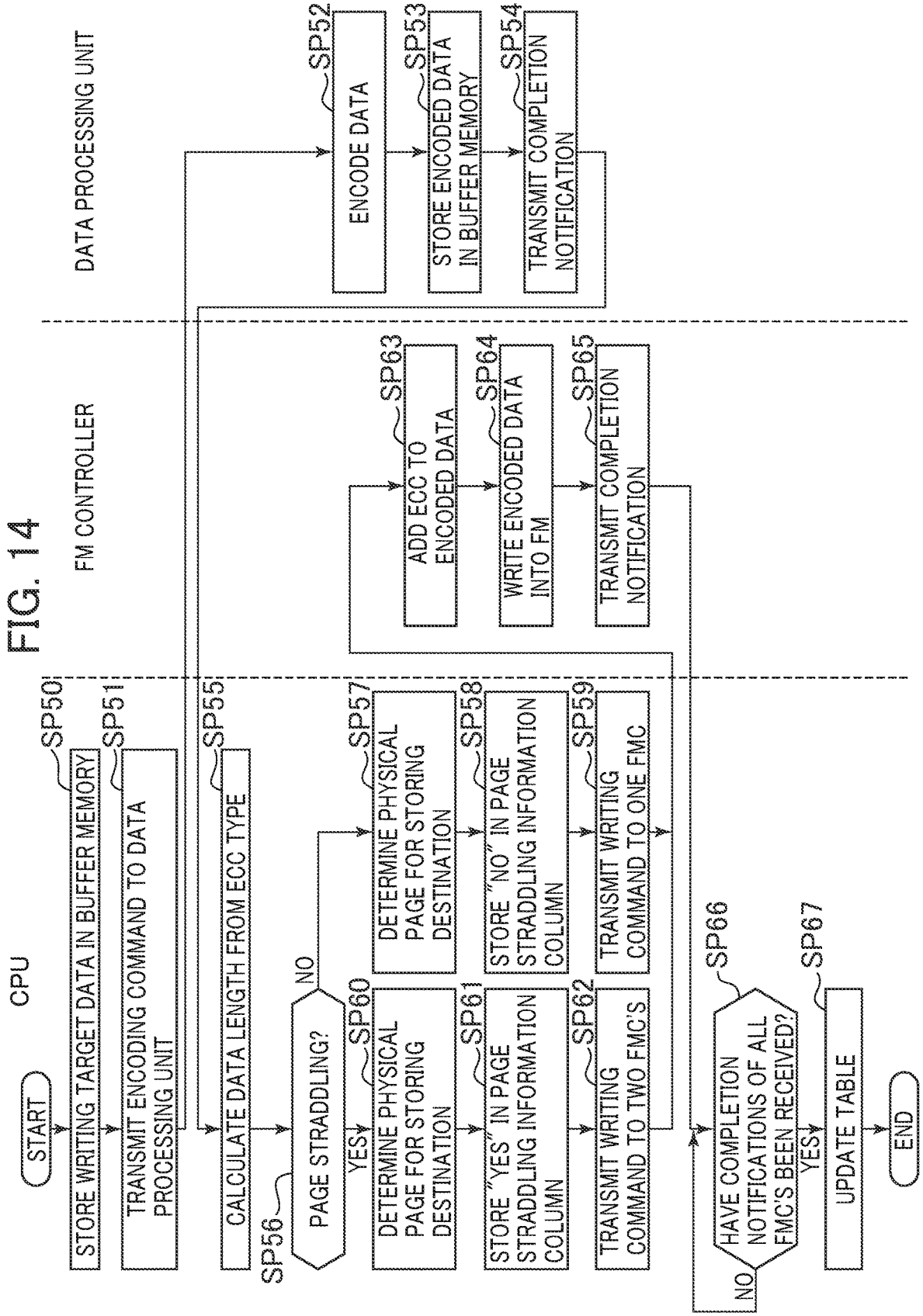
FIG. 14 is a flowchart illustrating the flow of the writing process in the flash storage according to the second embodiment.

FIG. 14 illustrates the flow of the writing process in the flash storage 73 according to this embodiment. In the following description, like the first embodiment, the data length of writing target data targeted by one writing request is equal to the data size for one logical page.

Typically, the writing process is started when a flash controller 74 (FIG. 2) receives writing target data and its writing request from the higher-level device. Actually, when the flash storage 73 receives the writing target data and its writing request from the higher-level device, the CPU 30 first stores the writing target data received at that time in the buffer memory (FIG. 2) (SP50), and then, transmits, to the data processing unit 76 (FIG. 2), an encoding command to encrypt the writing target data (SP51).

Upon receiving such encoding command, the data processing unit 76 executes the encoding process for encoding the writing target data stored in the buffer memory 35 (SP52), and stores the thus obtained encrypted data in the buffer memory 35 (SP53). Then, the data processing unit 76 transmits, to the CPU 30, a completion notification to notify that the encoding process to the writing target data has been completed (SP54).

Upon receiving such completion notification, the CPU 30 then calculates each of the total number of code words of the encrypted data (the number of code words) and the data length of each of the code words (the code word length) from the ECC type used in the ECC process executed to the encrypted data by the ECC circuit 61 of the flash memory controller 75 (FIG. 6), calculates, based on the calculation result, the data length of the entire ECC-added encrypted data (SP55), and determines, based on the calculation result, whether or not the page straddling occurs when the ECC-added encrypted data is stored in the physical page (SP56).

Specifically, the CPU 30 determines whether or not the ECC-added encoded data satisfies the following equation:

[Equation 2]

$$\text{the size of the physical page} < \text{the offset amount of the encrypted data} + \text{the CW length} \times \text{the number of CWs} \qquad (2)$$

where the number of code words of the encrypted data is "the number of CWs" and the data length of each of the code words is "the CW length". When such encrypted data satisfies Equation (2), the CPU 30 determines that the page straddling occurs, and when such encrypted data does not satisfy Equation (2), the CPU 30 determines that the page straddling does not occur. It is to be noted that "the offset amount of the encrypted data" means the offset amount from the head of the physical page in the writing position of the encrypted data, in the physical page into which the encrypted data is written.

Then, when obtaining a negative result in this determination, the CPU 30 determines one physical page for the storing destination of the encrypted data (SP57), and updates the logical-physical conversion table 90 (SP58). Specifically, in step SP58, in the logical-physical conversion table 90, the CPU 30 stores "NO" in the page straddling information column 90E in the row in which the address of the logical page for the writing destination of the writing target data is stored in the logical page address column 90A.

Then, the CPU 30 transmits, to the corresponding flash memory controller 75, a writing command that designates the ECC-added encrypted data stored in the buffer memory 35 and the physical page determined as the writing destination of the data in step SP57 (SP59), and then, the routine goes to step SP63.

On the contrary, when obtaining a positive result in the determination in step SP56, the CPU 30 determines each of the physical page for the storing destination of the first half portion of the encrypted data and the physical page for the storing destination of the latter half portion of the encrypted data (SP60).

In addition, based on such determination results, the CPU 30 updates the logical-physical conversion table 90 like step SP58 (SP61). Specifically, in the logical-physical conversion table 90, the CPU 30 stores "YES" in the page straddling information column 90E in the row in which the address of the logical page for the writing destination of the writing target data is stored in the logical page address column 90A (SP61). It is to be noted that as described above, when the page straddling information column 90E of the logical-physical conversion table 90 is omitted, the process in step SP61 is also omitted.

Subsequently, the CPU 30 transmits, to the corresponding flash memory controller 75, a writing command that designates the physical page determined as the storing destination of the first half portion of the encrypted data in step SP60 and the first half portion of the encrypted data stored in the buffer memory 35 (the portion from the head of the encrypted data, the portion having the largest amount of data that can be stored in the physical page determined as the storing destination of the first half portion of the encrypted data). In addition, the CPU 30 transmits, to the corresponding flash memory controller 75, a writing command that designates the physical page determined as the storing destination of the latter half portion of the encrypted data in step SP60 and the latter half portion of the encrypted data stored in the buffer memory 35 (the remaining portion of the encrypted data) (SP62).

Then, each of the flash memory controllers 75 that have received such writing commands reads each of the first half portion and the latter half portion of the encrypted data designated by the corresponding writing command, from the buffer memory 35 into the internal buffer 60 (FIG. 6) in the interior of the flash memory controller 75, and adds an ECC to each of the first half portion and the latter half portion of the read encrypted data (SP63). Specifically, the flash memory controller 75 divides the encrypted data read into the internal buffer 60, into one or a plurality of data segments having a predetermined size, and adds, to each of these data segments obtained in this manner, an ECC according to the content of the data segment.

Subsequently, each of the flash memory controllers 75 writes each of the first half portion and the latter half portion of the encrypted data subjected to the ECC addition as described above, into the physical page designated as the writing destination by the writing command given from the CPU 30 at that time, in the flash memory 20 controlled by the flash memory controller 75 (SP64).

In addition, the flash memory controller 75 then transmits, to the CPU 30, a completion notification to notify that the writing of the encrypted data has been completed (SP65). It is to be noted that in this case, the address in the physical page in which the flash memory controller 75 stores the encrypted data at that time (for example, "0", "1", and the like) may be notified to the CPU 30. However, the notification of the physical page address of the latter half portion of the encrypted data in which the page straddling occurs can be omitted. This is applicable when the entire data cannot be stored in a physical page, another physical page in which the continuation of the data is stored is previously determined.

At this time, the CPU 30 waits for the transmission of the completion notifications from all the flash memory controllers 75 that have transmitted the writing commands in step SP59 or step SP62 (SP66).

Then, when completing the reception of the completion notifications from all the flash memory controllers 75 that have transmitted the writing commands in step SP59 or step SP62, the CPU 30 updates the logical-physical conversion table 90 according to the contents of the process that has been performed until now (SP67).

Specifically, in the logical-physical conversion table 90, the CPU 30 stores the address of the physical page determined in step SP60 at that time, in the physical page address column 90B in the row in which the address of the logical page for the writing destination of the writing target data is stored in the logical page address column 90A. In addition, the CPU 30 stores the offset amount from the head of such physical page when the encrypted data is written into the physical page, in the data offset column 90C in the row, and stores the ECC type used in the ECC addition process to the encrypted data, in the ECC type column 90D in the row (SP67). It is to be noted that together with this, in step SP67, the content of the page straddling information column 90E in the corresponding row of the logical-physical conversion table 90 may be updated. In that case, steps SP58 and SP61 are not required. Then, the CPU 30 ends the sequence of these processes, so that the sequence of the processes to the writing request from the higher-level device received at this time is ended.

Figure 15:
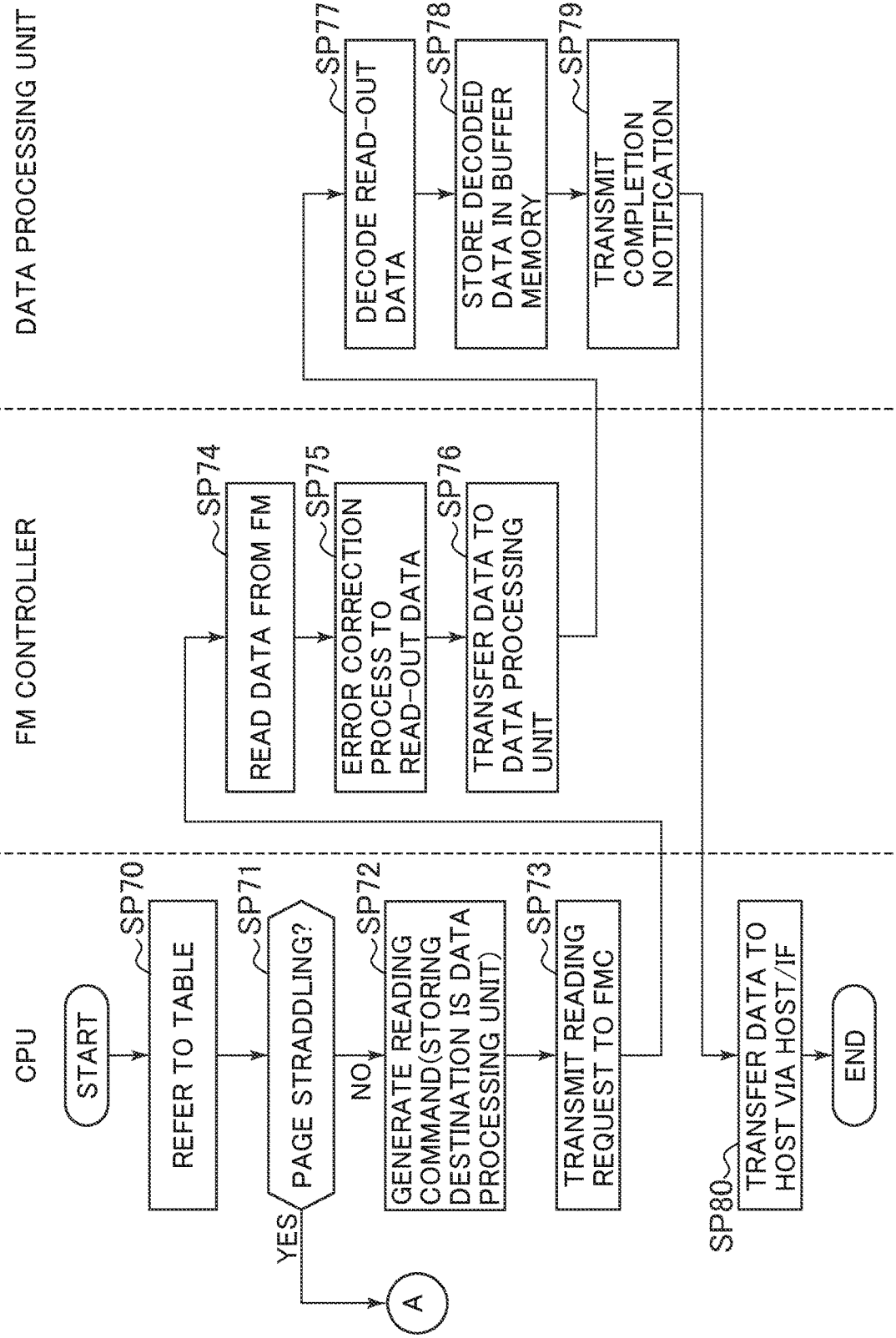
FIG. 15 is a flowchart illustrating the flow of the reading process in the flash storage according to the second embodiment.

On the other hand, FIGS. 15 and 16 illustrate examples of the flows of the reading process executed in the flash storage 73. This reading process is started when the flash storage 73 receives a reading request that is given from the higher-level device, for example, the host 2 and includes the address of the logical page in which reading target data is stored.

Actually, when the flash storage 73 receives the reading request from the higher-level device, the CPU 30 first refers to the logical-physical conversion table 90 (FIG. 13), obtains the value of the page straddling information stored in the page straddling information column 90E in the row corresponding to the logical page in which the data designated by the reading request is to be read (SP70), and determines, based on the obtained value of the page straddling information, whether or not the reading target data is stored across two physical pages (whether or not the value stored in the page straddling information column 90E is "YES") (SP71).

It is to be noted that when the page straddling information column 90E is omitted in the logical-physical conversion table 90, the data length can be determined from the ECC type used when the reading target data is encrypted, so that whether or not the reading target data is stored across two physical pages is determined by Equation (2) described above, based on the data offset amount stored in the data offset column 90C (FIG. 13) in the row corresponding to the logical page designated as the reading source of the data by the reading request, among the respective rows of the logical-physical conversion table 90, the ECC type stored in the ECC type column 90D (FIG. 13) in the same row, and the previously set data length of the physical page. In addition, also in the case where the ECC type column 90D is omitted, when the ECC type used in the error correction process is uniquely determined, the data length can be obtained, so that whether or not the data straddling occurs can be determined.

Thereafter, the CPU 30 generates a reading command targeting the reading target data designated by the reading request like steps SP22 and SP23 of the first embodiment described above with reference to FIG. 9 (SP72), and transmits the generated reading command to the corresponding flash memory controller 75 (SP73).

The flash memory controller 75 that has received this reading command reads the reading target data from the flash memory 20 into the internal buffer 60 (FIG. 6) according to the received reading command (SP74). In addition, the flash memory controller 75 removes the ECC added to the reading target data from the read reading target data, uses the ECC to subject the reading target data to the error correction process for correcting the error of the reading target data (SP75), and then, stores, as read-out data, the reading target data subjected to this error correction process, in the internal buffer 60. In addition, the flash memory controller 75 then transfers the read-out data stored in the internal buffer 60 to the data processing unit 76 (FIG. 2) together with a decoding command (SP76).

When being given the decoding command and the read-out data from the flash memory controller 75, the data processing unit 76 executes the decoding process for decoding the read-out data (SP77), and stores the decoded read-out data in the buffer memory 35 (SP78). Then, the flash memory controller 75 transmits a completion notification to the CPU 30 (SP79).

The CPU 30 that has received this completion notification allows the host interface 32 (FIG. 2) to read the above-described decoded read-out data stored in the buffer memory 35, and to transmit the read read-out data to the host 2 for the transmission source of the reading request (SP80). Then, the CPU 30 ends the sequence of these reading processes.

On the contrary, when obtaining a positive result in the determination in step SP71, as illustrated in FIG. 16, the CPU 30 generates a reading command with respect to the first half portion of the encrypted data (SP81), and transmits the generated reading command to the flash memory controller 75 controlling the flash memory 20 providing the physical page in which the first half portion is stored (SP82). In addition, the CPU 30 generates a reading command with respect to the latter half portion of the encrypted data (SP81), and transmits the generated reading command to the flash memory controller 75 controlling the flash memory 20 providing the physical page in which the latter half portion is stored (SP82).

As a result, like steps SP35 to SP38 of the first embodiment described above with reference to FIG. 10, each of the first half portion and the latter half portion of the reading target data subjected to the encoding process is read from the flash memory 20 by the corresponding flash memory controller 75 (SP83), and is subjected to the error correction process, as needed (SP84), so that each of the first half portion and the latter half portion is stored as read-out data in the buffer memory 35 (SP85). With this, the first half portion and the latter half portion of the read-out data subjected to the encoding process are integrated on the buffer memory 35, thereby restoring the original encrypted data. In addition, each of these flash memory controllers 75 then transmits a completion notification to the CPU 30 (SP86).

When the completion notifications are transmitted from all the flash memory controllers 75 that have transmitted the reading commands are transmitted (SP87: YES), the CPU 30 transmits, to the data processing unit 76 (FIG. 2), a decoding command to decode the above-described read-out data (encrypted data) stored in the buffer memory 35 (SP88). It is to be noted that this decoding command also stores the address on the buffer memory 35 into which the decoded read-out data is to be written.

Upon receiving this decoding command, the data processing unit 76 reads the above-described read-out data (encrypted data) stored in the buffer memory 35 into an internal buffer 76A (FIG. 2) of the data processing unit 76 (SP89), and executes the decoding process to the read encrypted data (SP90). In addition, the data processing unit 76 stores the thus decoded read-out data in the address position on the buffer memory 35 designated by the decoding command (SP91), and then transmits a completion notification to the CPU 30 (SP92).

Upon receiving such completion notification, the CPU 30 controls the host interface 32 (FIG. 2) so that the host interface 32 reads the above-described extended read-out data stored in the buffer memory 35, and transmits the read read-out data to the host 2 for the transmission source of the reading request (SP93). Then, the CPU 30 ends the sequence of these reading processes.

As described above, also in the computer system 70 according to this embodiment, when the reading target data is stored across two flash memories 20, the read-out data is given to the data processing unit 76 via the buffer memory 35, whereas when the reading target data is stored in one flash memory 20, the read-out data is directly given to the data processing unit 76 not via the buffer memory 35.

Therefore, like the first embodiment, according to the computer system 70, the amount of data inputted to and outputted from the buffer memory 35 can be efficiently reduced, and a bottleneck in performance due to the excessive use of the bandwidth of the buffer memory 35 can be improved, so that the lowering of the performance of the flash storage 73 can be effectively prevented.

(3) Other Embodiments

It is to be noted that although according to the above-described first and second embodiments, the case where the present invention is applied to the SSD has been described, the present invention is not limited to this, and is widely applicable to various other storage devices.

In addition, although according to the above-described first and second embodiments, the case where the data length of writing target data given from the higher-level device to the flash storages 15 and 73 is equal to the data size of one logical page has been described, the present invention is not limited to this, and is applicable when the data length of such writing target data is smaller than the data size of one logical page, or is larger than the data size of one logical page.

Further, although according to the above-described first and second embodiments, the case where the flash storages 15 and 73 have the data processing units 34 and 76, respectively, has been described, the present invention is not limited to this, and is applicable to the case where the flash storages 15 and 73 do not have such data processing units 34 and 76, respectively.

Furthermore, although according to the above-described first and second embodiments, the case where the first conversion process to data read from and written into a plurality of storage media is executed, and the flash controllers 21 and 74 as the medium controllers that read and write the data to which the first conversion process is executed, from and into a plurality of storage media, are configured as illustrated in FIG. 2 has been described, the present invention is not limited to this, and various other configurations are widely applicable.

INDUSTRIAL APPLICABILITY

The present invention is widely applicable to various storage devices, such as the SSD, having a plurality of storage media, and dividing and storing data into the plurality of storage media, as needed.

LIST OF REFERENCE SIGNS

1, 70 . . . computer system, 2 . . . host, 4, 71 . . . storage system, 11, 72 . . . flash storage device, 15, 73 . . . flash storage, 20 . . . flash memory, 21, 74 . . . flash controller, 30 . . . CPU, 34 . . . data processing unit, 35 . . . buffer memory, 36, 75 . . . flash memory controller, 44 . . . logical-physical conversion program, 45, 90 . . . logical-physical conversion table, 61 . . . ECC circuit

The invention claimed is:

1. A storage device comprising:
a plurality of storage media each having a plurality of pages that are each the reading and writing unit of data;
a buffer memory temporarily holding the data read from and written into the plurality of storage media; and
a medium controller executing a first conversion process to the data read from and written into the plurality of storage media, and reading and writing the data to which the first conversion process is executed, from and into the plurality of storage media,
wherein the medium controller determines:
whether or not reading target data subjected to the first conversion process is divided and stored into two or more of the plurality of pages;
when the reading target data subjected to the first conversion process is stored in one of the plurality of pages, reads the data from the one of the plurality of pages, and executes, to the data read from the one of the plurality of pages, a second conversion process for returning the data to a state before the read data was subjected to the first conversion process; and
when the reading target data is divided and stored into two or more of the plurality of pages, reads a portion of the data from each of the two or more pages in which the portion of the data is stored, stores the portions of the data in the buffer memory, restores the divided data that was subjected to the first conversion process, and executes the second conversion process to the restored data.

2. The storage device according to claim 1,
wherein the medium controller holds, as data straddling information, whether or not writing target data is divided and stored into two or more of the plurality of pages, and
the medium controller determines, based on the held data straddling information, whether or not the data is divided and stored into the plurality of pages.

3. The storage device according to claim 2,
wherein the medium controller:
holds the data straddling information for each of logical pages that are each the reading and writing unit of the data in a higher-level device; and
based on the corresponding data straddling information, determines, for each of the logical pages, whether or not the data subjected to the first conversion process is divided and stored into the plurality of pages.

4. The storage device according to claim 3,
wherein the first conversion process is a process with a change in data size.

5. The storage device according to claim 4,
wherein the first conversion process is a compression process for compressing data,
the second conversion process is an extension process for extending the compressed data, and
the medium controller determines, for each of the logical pages, whether or not the reading target data is divided and stored into two or more pages, based on an offset amount in the writing position in the page of the compressed data written into the page, a data length of the data, and a data size of the page.

6. The storage device according to claim 1,
wherein the medium controller:
divides the writing target data into a plurality of data segments having a predetermined data size, and as the first conversion process, adds, to each of the data segments, an error-correcting code according to the content of the data segment;

as the second conversion process, subjects the data read from each of the storage media to an error code correction process for correcting the error of the data, for each of the data segments, as needed, based on the error-correcting code added to the data segment; and determines, for each of the logical pages that are each the reading and writing unit of the data in a higher-level device, whether or not the reading target data is divided and stored into the plurality of pages, based on an offset amount in the writing position in the page of the data that is written into the page and to which the error-correcting code is added, the number of the data segments, a data length of the data segment to which the error-correcting code is added, and a data size of the page.

7. The storage device according to claim 6, wherein the medium controller encrypts the writing target data before the writing target data is divided into the plurality of data segments.

8. A method for controlling a storage device that stores data from a higher-level device,
wherein the storage device includes:
a plurality of storage media each having a plurality of pages that are each the reading and writing unit of data;
a buffer memory temporarily holding the data read from and written into the plurality of storage media; and
a medium controller executing a first conversion process to the data read from and written into the plurality of storage media, and reading and writing the data to which the first conversion process is executed, from and into the plurality of storage media,
the method comprising:
a first step in which the medium controller determines whether or not reading target data subjected to the first conversion process is divided and stored into two or more of the plurality of pages; and
a second step in which when the reading target data subjected to the first conversion process is stored in one of the plurality of pages, the medium controller reads the data from the one of the plurality of pages, and executes, to the data, a second conversion process for returning the data to a state before the data was subjected to the first conversion process, and in which when the reading target data is divided and stored into two or more of the plurality of pages, reads a portion of the data from each of the two or more pages in which the portion of the data is stored, stores the portions of the data in the buffer memory, restores the divided data that was subjected to the first conversion process, and subjects the restored data to the second conversion process.

9. The method for controlling a storage device according to claim 8,
wherein the medium controller holds, as data straddling information, whether or not writing target data is divided and stored into two or more of the plurality of pages, and
in the first step, the medium controller determines, based on the held data straddling information, whether or not the data is divided and stored into the plurality of pages.

10. The method for controlling a storage device according to claim 9,
wherein the medium controller:
holds the data straddling information for each of logical pages that are each the reading and writing unit of the data in a higher-level device; and
based on the corresponding data straddling information, determines, for each of the logical pages, whether or not the data subjected to the first conversion process is divided and stored into the plurality of pages.

11. The method for controlling a storage device according to claim 10,
wherein the first conversion process is a process with a change in data size.

12. The method for controlling a storage device according to claim 11,
wherein the first conversion process is a compression process for compressing data,
the second conversion process is an extension process for extending the compressed data, and
in the first step, the medium controller determines, for each of the logical pages, whether or not the reading target data is divided and stored into two or more pages, based on an offset amount in the writing position in the page of the compressed data written into the page, a data length of the data, and a data size of the page.

13. The method according to claim 8,
wherein the medium controller:
divides writing target data into a plurality of data segments having a predetermined data size, and as the first conversion process, the medium controller adds, to each of the data segments, an error-correcting code according to the content of the data segment;
as the second conversion process, subjects the data read from each of the storage media to an error code correction process for correcting the error of the data, for each of the data segments, as needed, based on the error-correcting code added to the data segment; and
in the first step, determines, for each of the logical pages that are each the reading and writing unit of the data in the higher-level device, whether or not the reading target data is divided and stored into the plurality of pages, based on an offset amount in the writing position in the page of the data that is written into the page and to which the error-correcting code is added, the number of the data segments, a data length of the data segment to which the error-correcting code is added, and a data size of the page.

14. The method for controlling a storage device according to claim 13,
wherein the medium controller encrypts the writing target data before the writing target data is divided into the plurality of data segments.

15. A storage system that provides a storage area to a higher-level device comprising:
one or a plurality of storage devices each providing part of the storage area,
wherein the storage device includes:
a plurality of storage media each having a plurality of pages that are each the reading and writing unit of data;
a buffer memory temporarily holding the data read from and written into the plurality of storage media; and
a medium controller executing a first conversion process to the data read from and written into the plurality of storage media, and reading and writing the data to which the first conversion process is executed, from and into the plurality of storage media, wherein the medium controller:

determines whether or not reading target data subjected to the first conversion process is divided and stored into two or more of the plurality of pages;

when the reading target data subjected to the first conversion process is stored in one of the plurality of pages, reads the data from the one of the plurality of pages, and executes, to the data, a second conversion process for returning the data to a state before the data is subjected to the first conversion process;

when the reading target data is divided and stored into two or more of the plurality of pages, reads a portion of the data from each of the two or more pages in which the portion of the data is stored, stores the portions of the data in the buffer memory, restores the divided data that was subjected to the first conversion process, and executes the second conversion process to the restored data.

\* \* \* \* \*